US010862562B2

(12) United States Patent
Malik et al.

(10) Patent No.: US 10,862,562 B2
(45) Date of Patent: Dec. 8, 2020

(54) BEAM REFINEMENT TECHNIQUES IN MILLIMETER WAVE SYSTEMS

(71) Applicant: QUALCOMM Incorporated, San Diego, CA (US)

(72) Inventors: Rahul Malik, San Diego, CA (US); Srinivas Yerramalli, San Diego, CA (US); Tamer Kadous, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/698,049

(22) Filed: Nov. 27, 2019

(65) Prior Publication Data
US 2020/0099436 A1 Mar. 26, 2020

Related U.S. Application Data

(63) Continuation of application No. 16/118,284, filed on Aug. 30, 2018, now Pat. No. 10,523,300.
(Continued)

(51) Int. Cl.
*H04B 7/06* (2006.01)
*H04B 7/0404* (2017.01)
*H04B 7/08* (2006.01)

(52) U.S. Cl.
CPC ......... *H04B 7/0689* (2013.01); *H04B 7/0404* (2013.01); *H04B 7/063* (2013.01);
(Continued)

(58) Field of Classification Search
CPC .... H04B 7/0695; H04B 7/0617; H04B 7/088; H04B 7/0408; H04B 7/063; H04B 7/0626;
(Continued)

(56) References Cited

U.S. PATENT DOCUMENTS

2011/0065448 A1   3/2011   Song et al.
2011/0255434 A1   10/2011  Ylitalo
(Continued)

FOREIGN PATENT DOCUMENTS

CN   104412519 A   3/2015
CN   104734766 A   6/2015
(Continued)

OTHER PUBLICATIONS

International Search Report and Written Opinion—PCT/US2018/049227—ISA/EPO—dated Nov. 19, 2018.
(Continued)

*Primary Examiner* — Khanh C Tran
(74) *Attorney, Agent, or Firm* — Qualcomm IP Dept.; James Hunt Yancey, Jr.

(57) ABSTRACT

Methods, systems, and devices for wireless communications are described that provide for refinement of receive beam beamforming parameters at a user equipment (UE). A UE may transmit two or more signals in an uplink transmission that have different beamforming parameters. A base station receiving the uplink transmission may measure the two or more signals, and identify a first signal of the two or more signals based at least in part on the measuring. The base station may inform the UE of the identified first signal, which the UE may use to set receive beam beamforming parameters for one or more subsequent downlink transmissions.

30 Claims, 15 Drawing Sheets

Related U.S. Application Data

(60) Provisional application No. 62/560,531, filed on Sep. 19, 2017.

(52) U.S. Cl.
CPC ......... H04B 7/0617 (2013.01); H04B 7/0695 (2013.01); H04B 7/088 (2013.01)

(58) Field of Classification Search
CPC .. H04B 7/0417; H04B 7/0619; H04B 17/309; H04B 7/0404; H04B 7/0632; H04B 7/0689; H04B 7/0697; H04B 7/0645; H04L 5/0048; H04L 5/0053; H04L 5/0051; H04L 5/006; H04L 1/0003; H04L 2027/018; H04L 25/0228; H04L 43/08
See application file for complete search history.

(56) References Cited

U.S. PATENT DOCUMENTS

| | | | | |
|---|---|---|---|---|
| 2011/0255543 A1* | 10/2011 | Zhi | ................ | G06F 15/17325 370/394 |
| 2014/0010178 A1 | 1/2014 | Yu et al. | | |
| 2017/0207845 A1* | 7/2017 | Moon | ................ | H04B 7/0695 |
| 2018/0288755 A1* | 10/2018 | Liu | ................ | H04W 72/046 |
| 2018/0309513 A1* | 10/2018 | Kim | ................ | H04W 72/0446 |
| 2018/0367374 A1* | 12/2018 | Liu | ................ | H04L 5/0053 |
| 2018/0368135 A1 | 12/2018 | Rune | | |
| 2019/0029036 A1 | 1/2019 | John et al. | | |
| 2019/0045481 A1* | 2/2019 | Sang | ................ | H04B 1/7156 |
| 2019/0089443 A1 | 3/2019 | Malik et al. | | |
| 2019/0132066 A1 | 5/2019 | Park et al. | | |
| 2020/0045597 A1* | 2/2020 | Tidestav | ................ | H04W 36/00835 |

FOREIGN PATENT DOCUMENTS

| | | |
|---|---|---|
| JP | 2013176050 A | 9/2013 |
| TW | 201728207 A | 8/2017 |
| WO | WO-2017142880 A1 | 8/2017 |

OTHER PUBLICATIONS

TIPO Notice of Allowance for TW App No. TW197130674 dated Sep. 30, 2020 that includes TIPO Search report dated Sep. 28, 2020.
Chinese Office Action issued in Application No. 201880059966.9, dated Jul. 23, 2020, 9 pages. Applicant provides original CNIPA Office Action and English translation provided by CN counsel.

* cited by examiner

BEAM REFINEMENT TECHNIQUES IN MILLIMETER WAVE SYSTEMS

CROSS REFERENCES

The present Application for Patent is a Continuation of U.S. patent application Ser. No. 16/118,284 by Malik, et al., entitled "BEAM REFINEMENT TECHNIQUES IN MILLIMETER WAVE SYSTEMS" filed Aug. 30, 2018, which claims the benefit of U.S. Provisional Patent Application No. 62/560,531 by Malik, et al., entitled "BEAM REFINEMENT TECHNIQUES IN MILLIMETER WAVE SYSTEMS," filed Sep. 19, 2017, assigned to the assignee hereof, and expressly incorporated herein.

BACKGROUND

The following relates generally to wireless communication, and more specifically to beam refinement techniques in millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In a mmW system, a base station and a UE may communicate via one or more directional beams. A transmitter (e.g. a base station) may engage in a beam sweeping procedure to establish an active beam pair with a receiver (e.g., a UE). An active beam pair may include an active transmit beam of the transmitter and a corresponding active receive beam of the receiver. The transmit beams and the receive beams in an active beam pair may be refined through, for example, beam refinement procedures. However, such beam refinement procedures may require multiple transmissions that each include multiple training symbols. Thus, the UE may remain in an awake mode expending power receiving and/or transmitting the multiple beam refinement transmissions, and the base station and UE may utilize resources during the refinement process. Furthermore, in some cases shared or unlicensed spectrum may be used for mmW transmissions, and access to such spectrum by a UE and transmitter may be subject to contention procedures (e.g., listen before talk (LBT) procedures), which can result in additional time for beam sweeping and refinement. Techniques that may provide more efficient beam refinement may be desirable to help enhance network efficiency.

SUMMARY

The described techniques relate to improved methods, systems, devices, or apparatuses that support beam refinement techniques in millimeter wave systems. Various described techniques provide for refinement of receive beam beamforming parameters at a user equipment (UE). In some cases, the UE may transmit two or more signals in an uplink transmission that have different beamforming parameters (e.g., that are beamformed in different directions, employ different antenna combinations, or combinations thereof). A base station receiving the uplink transmission may measure the two or more signals, and identify a first signal of the two or more signals based at least in part on the measuring (e.g., based on a gain measurement). The base station may inform the UE of the identified first signal, which the UE may use to set receive beam beamforming parameters for one or more subsequent downlink transmissions. In some cases, the base station may inform the UE of the identified first signal through two or more partitioned dimensions in an downlink transmission. In some cases, the UE may select the beamforming parameters of the first signal and, based on beam reciprocity, use the selected beamforming parameters to refine the receive beam beamforming parameters for one or more subsequent downlink transmissions.

A method of wireless communication is described. The method may include measuring one or more downlink transmission beams from a base station in a beam sweep procedure, transmitting an uplink transmission using an uplink resource, where the uplink resource is based at least in part on the measuring of the one or more downlink transmission beams, and where a first portion of the uplink transmission is associated with first beamforming parameters and a second portion of the uplink transmission is associated with second beamforming parameters, and the first portion of the uplink transmission and the second portion of the uplink transmission are beamformed in different directions, employ different antenna combinations, or a combination thereof, receiving an indication from the base station identifying the first portion of the uplink transmission, wherein the indication is based at least in part on the first portion of the uplink transmission and the second portion of the uplink transmission, and selecting the first beamforming parameters for receiving a subsequent downlink transmission from the base station based at least in part on the indication.

An apparatus for wireless communication is described. The apparatus may include means for measuring one or more downlink transmission beams from a base station in a beam sweep procedure, means for transmitting an uplink transmission using an uplink resource, where the uplink resource is based at least in part on the measuring of the one or more downlink transmission beams, and where a first portion of the uplink transmission is associated with first beamforming parameters and a second portion of the uplink transmission is associated with second beamforming parameters, and the first portion of the uplink transmission and the second portion of the uplink transmission are beamformed in different directions, employ different antenna combinations, or a combination thereof, means for receiving an indication from the base station identifying the first portion of the uplink transmission, wherein the indication is based at least in part on the first portion of the uplink transmission and the second portion of the uplink transmission, and means for selecting the first beamforming parameters for receiving a subsequent downlink transmission from the base station based at least in part on the indication.

Another apparatus for wireless communication is described. The apparatus may include a processor, memory in electronic communication with the processor, and instructions stored in the memory. The instructions may be operable to cause the processor to measure one or more downlink transmission beams from a base station in a beam sweep procedure, transmit an uplink transmission using an uplink resource, where the uplink resource is based at least in part on the measuring of the one or more downlink transmission beams, and where a first portion of the uplink transmission is associated with first beamforming parameters and a second portion of the uplink transmission is associated with second beamforming parameters, and the first portion of the uplink transmission and the second portion of the uplink transmission are beamformed in different directions, employ different antenna combinations, or a combination thereof, receive an indication from the base station identifying the first portion of the uplink transmission, wherein the indication is based at least in part on the first portion of the uplink transmission and the second portion of the uplink transmission, and select the first beamforming parameters for receiving a subsequent downlink transmission from the base station based at least in part on the indication.

A non-transitory computer readable medium for wireless communication is described. The non-transitory computer-readable medium may include instructions operable to cause a processor to measure one or more downlink transmission beams from a base station in a beam sweep procedure, transmit an uplink transmission using an uplink resource, where the uplink resource is based at least in part on the measuring of the one or more downlink transmission beams, and where a first portion of the uplink transmission is associated with first beamforming parameters and a second portion of the uplink transmission is associated with second beamforming parameters, and the first portion of the uplink transmission and the second portion of the uplink transmission are beamformed in different directions, employ different antenna combinations, or a combination thereof, receive an indication from the base station identifying the first portion of the uplink transmission, wherein the indication is based at least in part on the first portion of the uplink transmission and the second portion of the uplink transmission, and select the first beamforming parameters for receiving a subsequent downlink transmission from the base station based at least in part on the indication.

In some examples of the method, apparatus, and non-transitory computer-readable medium described above, the first beamforming parameters are associated with a first downlink transmission beam from the one or more downlink transmission beams received during the beam sweep procedure, and the second beamforming parameters are offset from the first beamforming parameters, where the first portion of the uplink transmission may be beamformed in a first direction and the second portion of the uplink transmission may be beamformed in a second direction.

In some examples of the method, apparatus, and non-transitory computer-readable medium described above, the first portion of the uplink transmission may include a first subset of frequency tones of the uplink resource and the second portion of the uplink transmission may include a second subset of the frequency tones of the uplink resource. In some examples of the method, apparatus, and non-transitory computer-readable medium described above, the indication received from the base station may be based at least in part on a gain measurement associated with each of the first portion of the uplink transmission and the second portion of the uplink transmission made at the base station. In some examples of the method, apparatus, and non-transitory computer-readable medium described above, the receiving the indication may include receiving a downlink transmission from the base station and determining the indication based at least in part on one or more partitioned dimensions used to transmit the downlink transmission. In some examples of the method, apparatus, and non-transitory computer-readable medium described above, the one or more partitioned dimensions comprise one or more of a time resource dimension, a frequency resource dimension, a root sequence dimension, a cyclic shift dimension, a time-frequency resource dimension, or any combination thereof.

In some examples of the method, apparatus, and non-transitory computer-readable medium described above, the first beamforming parameters for receiving the subsequent downlink may be selected based on beam reciprocity between uplink transmission beams and downlink transmission beams.

In some examples of the method, apparatus, and non-transitory computer-readable medium described above, the uplink resource may be selected based on a measured channel quality characteristic of the one or more downlink transmission beams from the base station in the beam sweep procedure. In some examples of the method, apparatus, and non-transitory computer-readable medium described above, the measuring the one or more downlink transmission beams may include measuring a gain of each of two or more tone beams in a first downlink transmission beam, wherein the two or more tone beams are beamformed in different directions.

In some examples of the method, apparatus, and non-transitory computer-readable medium described above, the uplink transmission may be a random access transmission, and the indication may be received in a random access response from the base station. Some examples of the method, apparatus, and non-transitory computer-readable medium described above may further include processes, features, means, or instructions for receiving configuration information that identifies the first portion of the uplink transmission and the second portion of the uplink transmission.

A method of wireless communication is described. The method may include transmitting one or more downlink transmission beams to a UE in a beam sweep procedure, receiving an uplink transmission from the UE responsive to one of the one or more downlink transmission beams, the uplink transmission including two or more beamformed signals that are beamformed in different directions, employ different antenna combinations, or a combination thereof, where the two or more beamformed signals include a first beamformed signal, measuring one or more characteristics of each of the two or more beamformed signals of the uplink transmission, and transmitting an indication of the first beamformed signal to the UE based at least in part on the measuring.

An apparatus for wireless communication is described. The apparatus may include means for transmitting one or more downlink transmission beams to a UE in a beam sweep procedure, means for receiving an uplink transmission from the UE responsive to one of the one or more downlink transmission beams, the uplink transmission including two or more beamformed signals that are beamformed in different directions, employ different antenna combinations, or a combination thereof, where the two or more beamformed signals include a first beamformed signal, means for measuring one or more characteristics of each of the two or more beamformed signals of the uplink transmission, and means for transmitting an indication of the first beamformed signal to the UE based at least in part on the measured one or more characteristics.

Another apparatus for wireless communication is described. The apparatus may include a processor, memory in electronic communication with the processor, and instructions stored in the memory. The instructions may be operable to cause the processor to transmit one or more downlink transmission beams to a UE in a beam sweep procedure, receive an uplink transmission from the UE responsive to one of the one or more downlink transmission beams, the uplink transmission including two or more beamformed signals that are beamformed in different directions, employ different antenna combinations, or a combination thereof, where the two or more beamformed signals include a first beamformed signal, measure one or more characteristics of each of the two or more beamformed signals of the uplink transmission, and transmit an indication of the first beamformed signal to the UE based at least in part on the measured one or more characteristics.

A non-transitory computer readable medium for wireless communication is described. The non-transitory computer-readable medium may include instructions operable to cause a processor to transmit one or more downlink transmission beams to a UE in a beam sweep procedure, receive an uplink transmission from the UE responsive to one of the one or more downlink transmission beams, the uplink transmission including two or more beamformed signals that are beamformed in different directions, employ different antenna combinations, or a combination thereof, where the two or more beamformed signals include a first beamformed signal, measure one or more characteristics of each of the two or more beamformed signals of the uplink transmission, and transmit an indication of the first beamformed signal to the UE based at least in part on the measured one or more characteristics.

In some examples of the method, apparatus, and non-transitory computer-readable medium described above, the two or more beamformed signals comprise two or more tone beams transmitted in the uplink transmission.

In some examples of the method, apparatus, and non-transitory computer-readable medium described above, the measuring may include measuring a gain associated with each of the two or more tone beams in the uplink transmission. In some examples of the method, apparatus, and non-transitory computer-readable medium described above, the transmitting the indication may include transmitting the response downlink transmission using a first partition of two or more partitioned dimensions for a response downlink transmission that is associated with the first beamformed signal, wherein each partitioned dimension of the two or more partition dimensions is associated with a different indication. In some examples of the method, apparatus, and non-transitory computer-readable medium described above, the one or more partitioned dimensions comprise one or more of a time resource dimension, a frequency resource dimension, a root sequence dimension, a cyclic shift dimension, a time-frequency resource dimension, or any combination thereof.

In some examples of the method, apparatus, and non-transitory computer-readable medium described above, the indication is further based at least in part on an uplink partition of a number of configured uplink partitioned dimensions used to transmit the uplink transmission, each configured uplink partitioned dimension comprising two or more partitions that may be associated with different beam refinement feedback.

In some examples of the method, apparatus, and non-transitory computer-readable medium described above, the uplink transmission may be a random access transmission, and the indication may be transmitted in a random access response to the UE.

Some examples of the method, apparatus, and non-transitory computer-readable medium described above may further include processes, features, means, or instructions for transmitting configuration information to the UE that identifies at least a first portion of the uplink transmission and a second portion of the uplink transmission that are to be used for transmission of the two or more beamformed signals of the uplink transmission.

DETAILED DESCRIPTION

Figure 1:
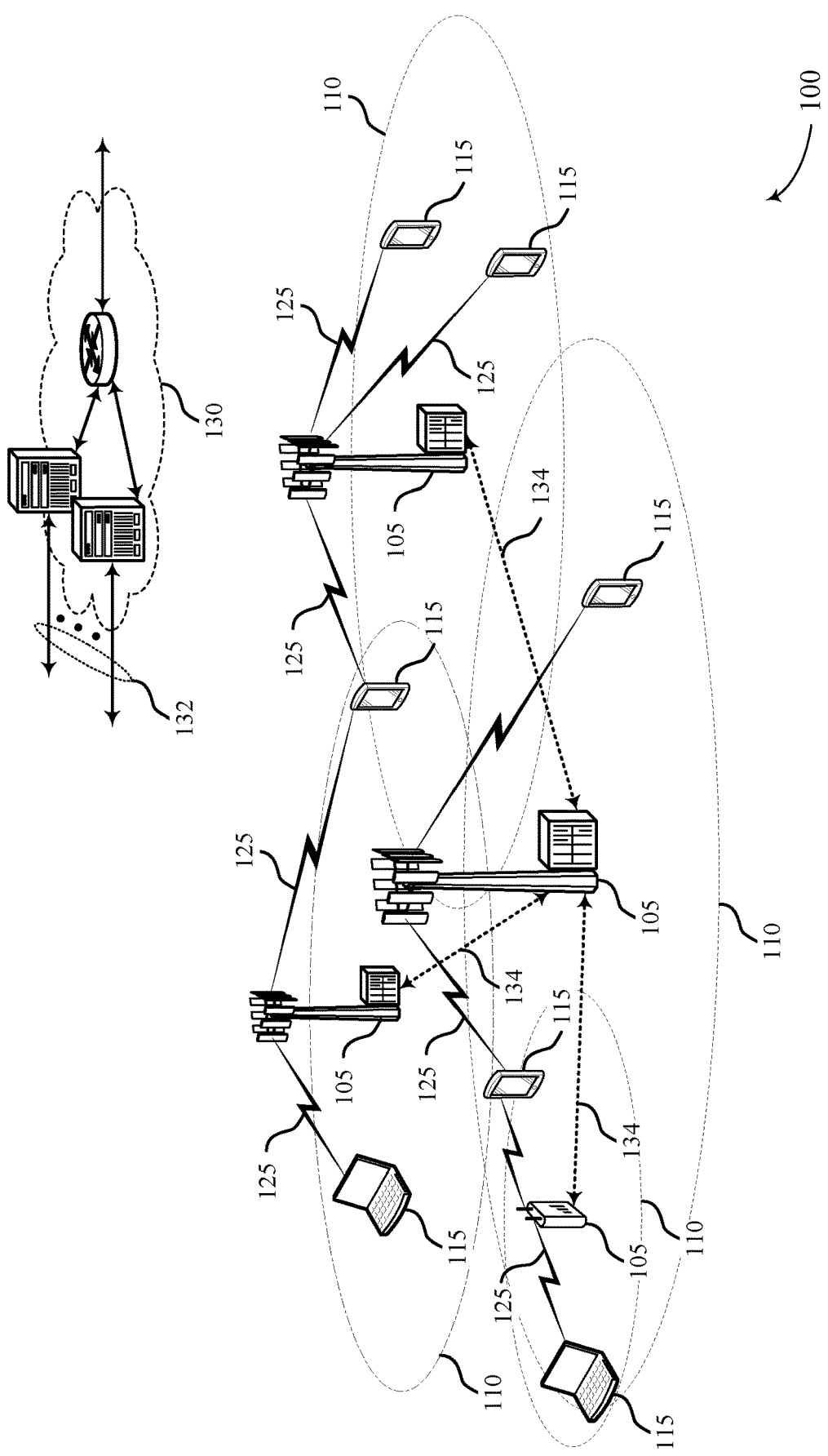
FIG. 1 illustrates an example of a system for wireless communication that supports beam refinement techniques in millimeter wave systems in accordance with aspects of the present disclosure.

Various described techniques provide for refinement of receive beam beamforming parameters at a user equipment (UE). In some cases, a UE may transmit two or more signals in an uplink transmission that have different beamforming parameters (e.g., in a random access request transmission). The two or more signals transmitted by the UE may be beamformed in different directions, employ different antenna combinations, or combinations thereof. A base station receiving the uplink transmission may measure the two or more signals, and identify a first signal of the two or more signals based at least in part on the measuring (e.g., based on a gain measurement). The base station may inform the UE of the identified first signal, which the UE may use to set beamforming parameters that are to be used for receiving one or more subsequent downlink transmissions. In some cases, the base station may inform the UE of the identified first signal through two or more partitioned dimensions in an downlink transmission. In some cases, the UE may select the beamforming parameters of the first signal and, based on beam reciprocity, use the selected beamforming parameters to refine the receive beam parameters for one or more subsequent downlink transmissions.

As indicated above, in mmW systems a base station and UE may communicate via one or more directional beams, and a base station may engage in a beam sweeping operation to establish an active transmit beam with a UE. A base station may also engage in beam tracking to maintain a connection with a UE. In some cases, the base station, as part of the beam sweep procedure, may perform a sector sweep with wide-formed, lower gain beams to establish a primary connection. Then, the base station may perform beam refinement using narrower, higher gain beams, and the UE may identify a transmit beam on which subsequent communications should be performed. The base station in some cases may perform a continuous beam tracking process by adjusting the refined beam to maintain the improved connection. In some cases, such beam refinement procedures may require multiple transmissions including multiple training symbols. In other cases, the base station may transmit beamformed signals for beam refinement along with wide-formed, lower gain beams.

Similarly, the UE may perform beam refinement on a receive beam. In some cases, the UE may request repetitions of a reference signal (e.g., a channel state information reference signal (CS-RS)), and the UE may switch its receive beamforming parameters across the repetitions to determine a best receive beam (e.g., based on reference signal received power (RSRP) measurements). Similarly as with the base station the UE may perform a continuous beam tracking process by adjusting the refined beam to maintain the improved connection. According to various aspects of the present disclosure, efficient UE receive beam refinement techniques may be provided that may reduce the number of repeated transmissions for UE beam refinement.

When establishing an initial connection, in some cases the base station may transmit consecutive beams in a beam sweeping operation in consecutive synchronization signal (SS) blocks. A relatively wide-formed beam may be transmitted to a particular sector or geographic area in a SS block, and then a subsequent beam may be transmitted to another sector or geographic area in a subsequent SS block. In some cases, each SS block has associated uplink resources, and a UE may transmit an uplink transmission, such as a random access request using a random access channel (RACH) in the uplink resources associated with the SS block in which the UE received the strongest downlink beam. Thus, the different uplink resources associated with different beams in a beam sweeping procedure may provide a time resource partition, and the UE transmission in a particular uplink resource may provide feedback to the base station of the wide-formed beam that the UE received with the highest gain, for example.

In some cases a base station may transmit signals that may be used for beam refinement within a wide-formed, lower-gain beam. In such cases, the base station may transmit multiple beamformed signals in different frequency tones, with such different tone beams each corresponding to a different beam direction of the SS block transmission within the overall relatively wide-formed beam. A UE may measure the gain from multiple of the different tone beams, and determine beam refinement feedback based on the measurements. In some cases, the identification and reporting of the wide-formed beam may be referred to as a P1 procedure, and the identification of beam refinement information associated with the narrower-formed higher-gain tone beams may be referred to as a P2 procedure. In some cases, the receive beam refinement procedure such as discussed above may be referred to as a P3 procedure.

Various aspects of the present disclosure, as indicated above, provide enhancements to a UE receive beam refinement procedure, or P3 procedure, in which the P3 procedure may be performed with a reduced number of downlink transmissions that are transmitted to the UE. In some cases, a UE may transmit an uplink transmission, such as a RACH random access request or a physical uplink control channel (PUCCH) transmission, in which two or more portions of the uplink transmission are transmitted with different beamforming parameters. The base station may measure the received signal for each of the two or more portions transmitted by the UE, and may signal which of the two or more portions had, for example, a highest gain measurement. The UE, assuming beam reciprocity between its uplink transmissions and receive beam transmissions, may apply the beamforming parameters of the indicated uplink portion for one or more subsequent downlink transmissions from the base station. The two or more portions of the uplink transmission may be beamformed in different directions, employ different antenna combinations, or combinations thereof. In some cases, the base station may inform the UE of the identified first signal through two or more partitioned dimensions in an downlink transmission.

Providing such receive beam refinement based in two or more uplink portions of an uplink transmission may allow a single uplink transmission and associated downlink indication to replace beam refinement processes that use multiple reference signal transmissions to evaluate and refine beamforming parameters. Reducing the number of downlink, and uplink, transmissions in such cases may allow for enhanced efficiency in the use of wireless resources and reduced power consumption at a UE, for example. Furthermore, in cases where a UE is moving within a system, such techniques may allow for more accurate information (e.g., more accurate beam refinement) that may be used in subsequent transmissions which may provide enhanced likelihood of successful receipt of transmitted data at the UE and base station. Additionally, in cases where mmW transmissions use a shared or unlicensed frequency spectrum band, a reduced number of transmissions between a UE and a base station is beneficial because it reduces the likelihood that a feedback procedure will be interrupted in the event that a different transmitter obtains the wireless channel.

Aspects of the disclosure are initially described in the context of a wireless communications system. Aspects of the disclosure are then illustrated by examples of wireless communications systems, and process flows. Aspects of the disclosure are further illustrated by and described with reference to apparatus diagrams, system diagrams, and flowcharts that relate to beam management techniques in millimeter wave systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network (also referred to as a 4G network), or a New Radio (NR) network (also referred to as a 5G network). In some cases, wireless communications system 100 may support enhanced broadband communications, ultra-reliable (i.e., mission critical) communications, low latency communications, and communications with low-cost and low-complexity devices. Wireless communications system 100 may support mmW transmissions, beam refinement techniques, as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). In such cases, a first UE 115 may be a transmitter and another UE 115 may be a receiver. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 MHz to 300 GHz. In some cases, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may use mmW communications between UEs 115 and base stations 105, which may use beamforming techniques for transmitting and receiving transmissions. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both. In some cases, mmW transmissions may use an unlicensed high frequency band and a separate anchor carrier may be established in a lower band.

As indicated above, some signals (e.g. synchronization signals, reference signals, beam selection signals, or other control signals) may be transmitted by a base station 105 multiple times in different directions in a beam sweep operation, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

As indicated above, in some cases uplink transmissions from a UE 115 to a receiver (e.g., a base station 105) may have two or more portions that are transmitted with different beamforming parameters. The base station 105 may measure the received signal for each of the two or more portions transmitted by the UE 115, and may signal which of the two or more portions had, for example, a highest gain measurement. The UE 115, assuming beam reciprocity between its uplink transmissions and receive beam transmissions, may apply the beamforming parameters of the indicated uplink portion for one or more subsequent downlink transmissions from the base station. In some cases, the two or more portions of the uplink transmission may be different subsets of frequency tones that are transmitted as different beamforming parameters as different tone beams in the uplink transmission.

Figure 2:
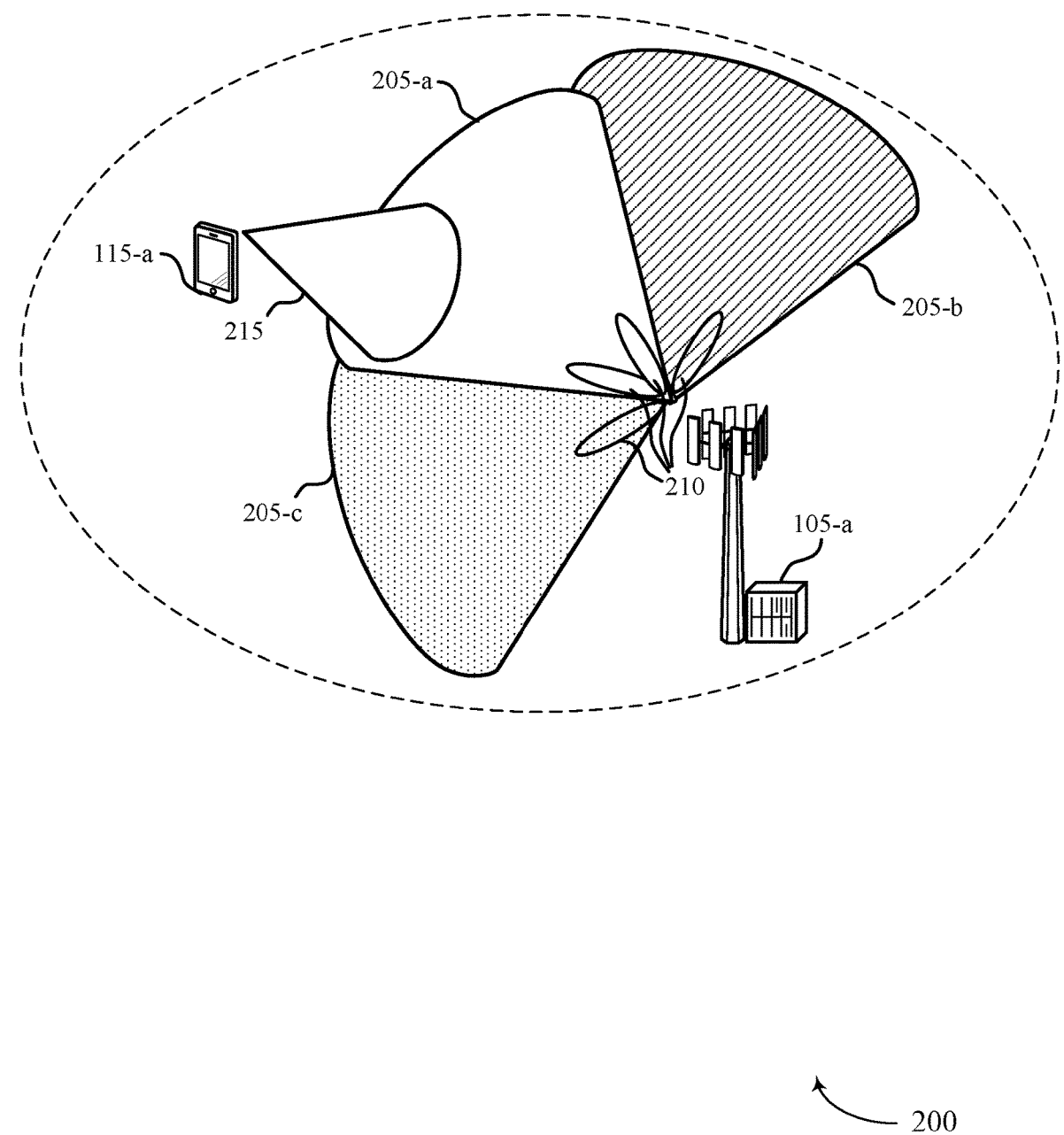
FIG. 2 illustrates an example of a wireless communication system that supports beam refinement techniques in millimeter wave systems in accordance with aspects of the present disclosure.

FIG. 2 illustrates an example of a wireless communication system 200 that supports beam refinement techniques in millimeter wave systems in accordance with various aspects of the present disclosure. Wireless communication system 200 may include a base station 105-a and a UE 115-a, which may be examples of the corresponding devices described with reference to FIG. 1. Base station 105-a and UE 115-a may communicate using one or more directional beams. In wireless communication system 200, a transmitter (e.g., base station 105-a) may engage in a beam sweeping operation to establish an active transmit beam with a receiver (e.g., UE 115-a), or beam tracking to maintain a connection with the receiver (e.g., UE 115-a).

In some examples, base station 105-a may engage in a beam sweeping operation to establish an active transmit beam with UE 115-a. In some examples, base station 105-a may also engage in a beam tracking procedure to maintain a connection with UE 115-a. Additionally, base station 105-a may transmit multiple beam refinement signals. For example, base station 105-a may use a first port to transmit a relatively wide-formed beams 205 (e.g., analog beams), that may be transmitted towards different sectors or geographic directions. In the example if FIG. 2, a first wide-formed beam 205-a may be transmitted in a first direction, a second wide-formed beam 205-b may be transmitted in a second direction, and a third wide-formed beam 205-c may be transmitted in a third direction. In some examples, the gain across a plurality of tones corresponding to wide-formed beams 205 may be close to equal.

In some cases, wide-formed beams 205 may not be narrow enough or have a high enough gain to be a preferred directional transmit beam. Transmissions from UE 115-a may be more clearly received and decoded if received via a highly directional and refined transmit beam. Therefore, it may be beneficial for base station 105-a and base station 105-a to use beam refinement to generate narrower beam-formed signals of refined beams 210, which may have a narrower coverage area but higher gain. UE 115-a may identify which of the refined beams 210 is received at the highest gain, and is therefore the preferred refined beam for subsequent transmissions. In some cases, the UE 115-a may provide feedback in a single random access request on an uplink beam 215 that indicates which of the wide-formed beams 205 and which of the refined beams 210 has a highest gain, or acceptable gain.

In some cases, the UE 115-a may perform a similar beam refinement technique to determine refined beamforming to be applied when receiving downlink transmission, such as for receiving refined beams 210. In some cases, as will be discussed in more detail below, the uplink beam 215 may include two or more portions that are transmitted with different beamforming parameters and may be used for beam refinement of receive beams at the UE 115-a.

In some cases, each wide-formed beam 205 may be associated with an SS block in which synchronization signals (e.g. a primary synchronization signal (PSS) and a secondary synchronization signal (SSS)) and physical broadcast channel (PBCH) transmissions may be transmitted in the corresponding beam direction. In some cases, the SS block may indicate an uplink transmission resource that UE 115-a may use for a random access transmission. In some cases, the random access transmission may be a RACH message-1 (MSG1) transmission that may indicate that the UE 115-a has uplink data to transmit or that the UE 115-*a* desires to establish a connection with the base station 105-*a*. Such RACH MSG1 may occupy a fraction of the entire system bandwidth, and in some cases, frequency resources for the uplink transmission may be partitioned, and a selected partition may be used to convey information (e.g., feedback information from the UE 115-*a*). For contention based random access, some NR systems provide uplink resource associated with an SS block and other information (e.g., a subset of RACH resources and/or preamble indices) that may be configured by a set of parameters in a master information block (MIB), system information block (SIB), remaining minimum system information (RMSI), or combinations thereof.

By partitioning the uplink resources and transmitting an uplink transmission in a particular partitioned resource (e.g., a particular frequency partition that is associated with particular feedback information), such a RACH MSG1 transmission may be overloaded with one or more other pieces of feedback information from the UE 115-*a* (e.g., beam refinement information). This may help to limit the number of uplink accesses as well as the amount of information that is sent, which may help to enhance network efficiency, power consumption, and reduce the likelihood of losing medium access in a shared spectrum system with contention-based medium access. In some cases, a downlink transmission may be similarly partitioned such that a downlink transmission (e.g., a RACH MSG2 message) may be overloaded with feedback information, such as which of the two or more differently beamformed portions of uplink beam 215 has a highest gain, for example.

Figure 3:
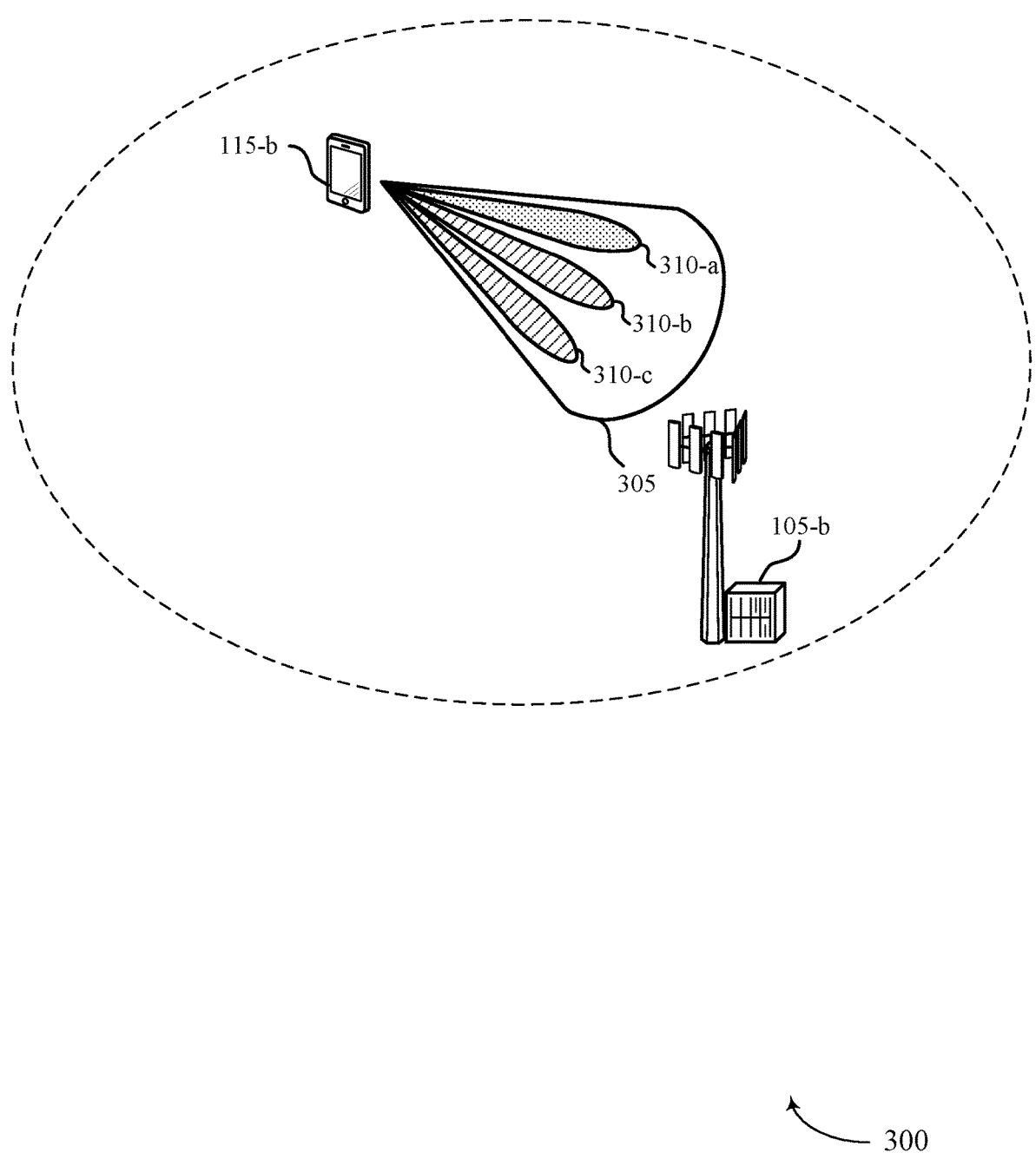
FIG. 3 illustrates another example of a wireless communication system that supports beam refinement techniques in millimeter wave systems in accordance with aspects of the present disclosure.

FIG. 3 illustrates an example of a wireless communication system 300 that supports beam refinement techniques in millimeter wave systems in accordance with various aspects of the present disclosure. Wireless communication system 300 may include a base station 105-*b* and a UE 115-*b*, which may be examples of the corresponding devices described with reference to FIGS. 1-2.

As indicated above, in some cases a beam refinement procedure (e.g. a P2 or a P3 procedure) may be used to identify a preferred refined transmit or receive beam. In some cases, the UE 115-*b* may perform beam refinement for receive beam parameters by transmitting an uplink transmission with differently beamformed portions. In some cases, the UE 115-*b* may use a first port to transmit a relatively wide beam 305, which may be formed using analog beamforming, in a first transmission. To generate and identify a refined transmit beam, UE 115-*b* may modulate (e.g., phase modulate or amplitude modulate) a beam refinement symbol, and transmit the modulated beam refinement symbol via a second port. The transmission of the first signal and the second, phase-modulated signal may result in a combined signal such that corresponding aspects, such as tones, are beamformed in one or more directions that at least partly overlap with the geographic sector of wide beam 305. By transmitting the combined signal, UE 115-*b* may generate one or more beamformed refined beams, such as tone beams 310. Each refined tone beam 310 may correspond to a different tone and to a different spatial direction, a different set of antennas used for transmission, some other beamforming parameter, or combinations thereof. For example, tone beam 310-*a* may correspond to a first tone and a first direction, whereas tone beam 310-*b* may correspond to a second tone and a second direction, and so forth. In such examples, each tone beam 310 may vary with respect to gain at a particular geographic location. The one or more tone beams 310 may completely or partially overlap with the geographic sector of wide beam 305. In some examples, the tone beams 310 may be referred to as beamformed signals or portions of an uplink transmission, and may be transmitted as a control channel transmission (e.g., a PUCCH transmission) or as a RACH random access request (e.g., MSG2 transmission) in uplink RACH resources corresponding to an SS block that is transmitted by the base station 105-*b* as part of a sector sweep or beam sweep operation.

In some cases, prior to transmitting the combined signal, UE 115-*b* may transmit a reference combined signal. The reference combined signal may include a first signal transmitted via the first port, and a second signal transmitted via the second port. The first signal transmitted via the first port may be a wide analog beam corresponding to beam 305. The second signal transmitted via the second port may be phase-modulated by some reference modulation. For example, the reference modulation may be a modulation of zero, such that the second signal is not phase-modulated at all with respect to the first signal. Alternatively, the reference modulation may be a non-zero phase-modulation, such that the second signal is modulated (e.g., phase modulated or amplitude modulated) with respect to the first signal. UE 115-*b* may transmit the resulting reference combined signal at a first time instance, and may transmit the combined signal at a second instance in time. The base station 105-*b* may receive the reference combined signal, and then receive the combined signal, such that measurements of the combined signal may be made with respect to the reference combined signal.

UE 115-*b* may control the direction of each tone beam 310 resulting from the combined signal by altering the phase of the transmission via the second port. Base station 105-*b* may measure the gain of each tone beam 310 (e.g., with respect to a previously received reference combined beam or with respect to other tone beams 310). In some examples, the tones may be frequency interleaved or block interleaved. Base station 105-*b* may determine a preferred tone beam 310, such as by measuring a gain of each tone beam 310 and selecting the tone beam 310 with a highest gain or that has an acceptable gain. The base station 105-*b* may transmit an indication of the preferred tone beam 310, and the UE 115-*b* may use the beamforming parameters associated with the indicated tone beam 310 for subsequent receive operations.

Figure 4:
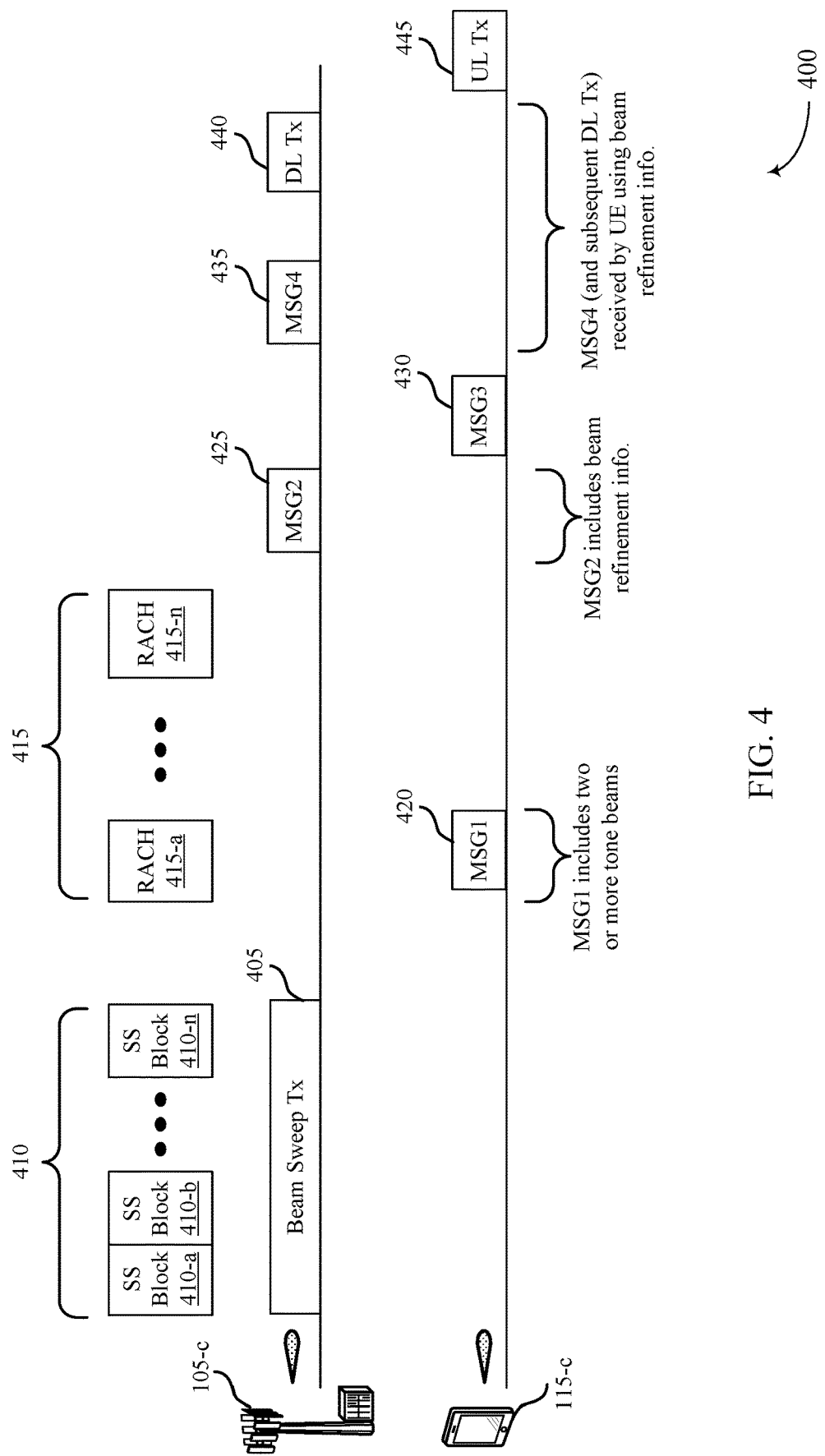
FIG. 4 illustrates an example of uplink and downlink transmissions that support beam refinement techniques in millimeter wave systems in accordance with aspects of the present disclosure.

FIG. 4 illustrates an example of uplink and downlink transmissions 400 that support beam refinement techniques in millimeter wave systems in accordance with aspects of the present disclosure. In some examples, uplink and downlink transmissions 400 may be used to implement aspects of wireless communication systems 100, 200, or 300. As discussed above, in some cases a base station 105-*c*, which may be an example of a base station 105 of FIG. 1, 2, or 3, may transmit multiple wide beam downlink transmissions in a beam sweep operation 405. In some cases, each wide beam may be transmitted in an SS block 410. In the example of FIG. 4, a first SS block 410-*a* may be an SS block for a first beam, a second SS block 410-*b* may be for a second beam, and an n-th SS block 410-*n* may be for an n-th beam.

In some cases, the base station 105-*c*, within each SS block 410, may transmit synchronization information in the form of a primary synchronization signal (PSS), a secondary synchronization signal (SSS), and a physical broadcast channel (PBCH) transmission. In some cases, each SS block 410 may have an associated uplink transmission resource 415 which may include a first RACH resource 415-*a* through an n-th RACH resource 415-*n*, each of which may correspond to one of the SS blocks 410. The UE 115-*c* in this example may monitor received signals during the beam sweep operation 405 and determine that the first SS block 410-*a* has a higher gain (e.g., a higher RSRP) than other of the SS blocks 410, and may determine the associated first RACH resource 415-a. In some examples, the base station 105-c may optionally incorporate tone beams in the SS block 410 transmissions, as discussed above, which may be used for beam refinement measurements.

The UE 115-c, in this example, may then transmit a random access MSG1 420 to the base station 105-c. In some cases, the UE 115-c may transmit two or more portions of the MSG1 420 transmission using different beamforming parameters. For example, the UE 115-c may incorporate tone beams into the MSG1 420 transmission to provide beam refinement signals on some known set of frequency resources (e.g., configured by RRC signaling, signaled in MIB, SIB, RMSI, or combinations thereof). Under the assumption of beam reciprocity, these transmitted beam refinement signals can be set to correspond to a set of P3 refinement reference signals transmitted to the UE.

In some examples, the UE 115-c also may transmit the MSG1 420 transmission on a partitioned dimension that is defined for the uplink MSG1 420 transmission. In some examples, the base station 105-c may configure a number of different partitioned dimensions, such as one or more frequency partitions, root sequence partitions, cyclic shift partitions, time-frequency resource partitions, time resource partitions, or combinations thereof. Thus, in the example of FIG. 4, the UE 115-c may measure one or more aspects associated with the transmission beam received in the first SS block 410-a and the second SS block 410-b, which may include measurements to two or more tone beams transmitted in each SS block 410, and select a particular partition in the first RACH resource 415-a for the MSG1 420 transmission. The base station 105-c may receive the uplink transmission and identify the partition of the transmission, and may thus determine that a particular tone beam has been indicated by the UE 115-c as having a highest gain among gain measurements of the UE 115-c, for example.

As indicated above, the UE 115-c may transmit one or more portions of the uplink transmission of MSG1 420 using different beamforming parameters. The base station 105-c may make a determination of a preferred uplink signal or portion of the uplink transmission of MSG1 420 (e.g., based on a highest gain among the two or more portions of the uplink transmission), and may transmit an indication to the UE 115-c of the identified portion of the uplink transmission. In some cases, the indication may be explicitly signaled by the base station 105-c. In other cases, the base station 105-c may transmit the indication by using a partitioned dimension of the downlink MSG2 425 transmission. In such cases, the base station 105-c may partition the downlink MSG2 425 transmission in a similar manner as the uplink MSG1 420 transmission may be partitioned, as discussed above. The UE 115-c may receive the MSG2 425 transmission and identify the partition used for the transmission. This partition may be mapped to a corresponding tone beam transmitted by the UE 115-c, and the UE 115-c may thus use the indication for P3 beam refinement.

In a contention based random access procedure, the UE 115-c may transmit a MSG3 430 random access message, and receive a subsequent MSG4 435 transmission from the base station 105-c, which may be followed by downlink transmissions 440 (e.g., PDCCH/PDSCH transmissions) and uplink transmissions 445 (e.g., PUCCH/PUSCH transmissions). In some cases, the MSG4 435 transmission and subsequent downlink transmissions 440 may be received by the UE 115-c according to the receive beam parameters identified in the beam refinement process. While the example of FIG. 4 illustrates an initial system access, such techniques may be used in other transmissions as well, such as a PUCCH transmission that includes two or more portions with different beamforming parameters, and subsequent PDCCH transmission that indicates a preferred portion of the uplink transmission.

Figure 5:
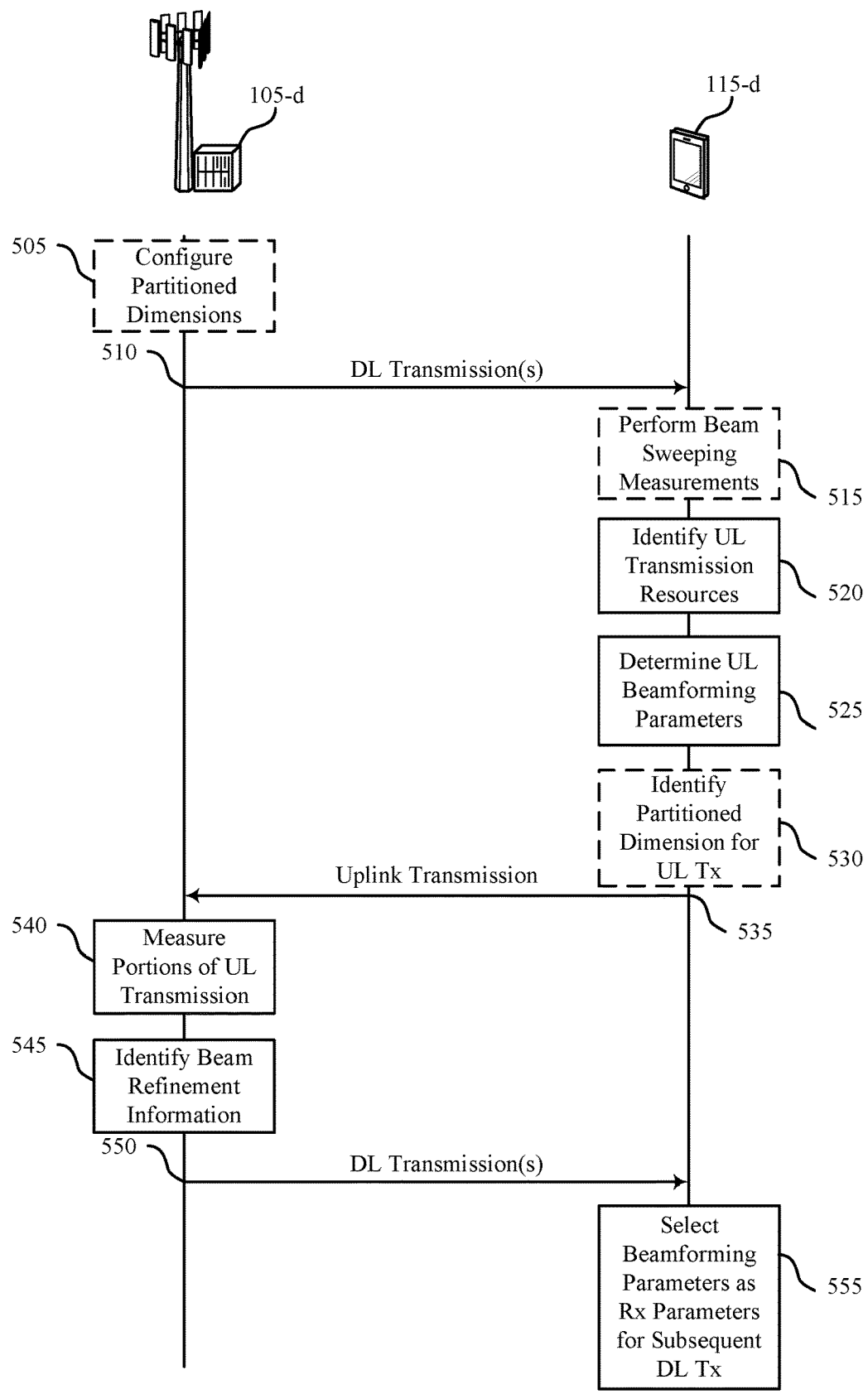
FIG. 5 illustrates an example of a process flow that supports beam refinement techniques in millimeter wave systems in accordance with aspects of the present disclosure.

FIG. 5 illustrates an example of a process flow 500 that supports beam refinement techniques in millimeter wave systems in accordance with various aspects of the present disclosure. In some examples, process flow 500 may implement aspects of wireless communication systems 100, 200, 300, or 400. Process flow 500 may include the transmission of wide beams and tone beams from base station 105-d, and feedback from UE 115-d.

Initially, at optional block 505, the base station 105-d may configure one or more partitioned dimensions. As discussed above, the one or more partitioned dimensions may be used to provide feedback information in an uplink transmission to the base station 105-d or in a downlink transmission to the UE 115-d. In some cases, the one or more partitioned dimensions may include one or more of a time resource dimension including a set of available time resources for a transmission, a frequency resource dimension including set of available frequency resources the transmission, a root sequence dimension including a set of root sequences available for the transmission, a cyclic shift dimension including a set of cyclic shifts available for the transmission, a time-frequency dimension that includes a set of time-frequency resources available for the transmission, or any combination thereof. The base station 105-d may configure the different partitioned dimensions based on an amount of resources available for each dimension (e.g., a frequency bandwidth for the associated uplink or downlink transmission), and provide an indication in, for example, RRC signaling, MIB/SIB/RMSI transmissions, or combinations thereof.

The base station 105-d may transmit downlink transmission(s) 510 to the UE 115-d. In some cases, the downlink transmissions may be beam sweep transmissions that each may be associated with an SS block in which synchronization signals (e.g. a primary synchronization signal (PSS) and a secondary synchronization signal (SSS)) and physical broadcast channel (PBCH) transmissions) may be transmitted in the corresponding beam direction. In some cases, the SS block may indicate an uplink transmission resource that UE 115-d may use for a random access transmission. In some cases, one or more tone beams may be transmitted in each SS block transmission, which may be used for P2 beam refinement.

In cases where the downlink transmissions 510 are beam sweep transmissions, at optional block 515, the UE 115-d may perform beam sweeping measurements. The beam sweeping measurements may include, for example, gain measurements made by the UE 115-d to measure a gain associated with each SS block transmission. In some cases, the beam sweeping measurements may include measuring the gain of each tone beam (e.g., with respect to a previously received reference combined beam or with respect to other tone beams) transmitted in an SS block. In some cases, the downlink transmission(s) 510 may be PDCCH or PDSCH transmissions which may include a grant of one or more uplink resources for the UE 115-d. In some examples, downlink transmissions may also indicate that beam refinement may be performed using the corresponding uplink transmission.

At block 520, the UE 115-d may identify uplink transmission resources. In cases where the downlink transmission(s) 510 are beam sweep transmissions, the identification of the uplink resources may be made based on an associated uplink transmission resource that corresponds with each particular SS block of the beam sweep transmissions, for example. In cases where the downlink transmission(s) 510 are PDCCH or PDSCH transmissions, the UE 115-d may identify uplink resources based on resources allocated to the UE 115-d in an uplink grant. As indicated above, in some cases the downlink transmission(s) 510 may indicate that a beam refinement procedure may be performed using an associated uplink resource.

At block 525, the UE 115-d may determine uplink beamforming parameters. In some cases, the UE 115-d may identify different uplink resources that may use different beamforming parameters for the uplink transmission. In some cases, the UE 115-d may identity different frequency tones or subsets of frequency tones of the uplink transmission that may each be transmitted using different beamforming parameters. In some cases, the different beamforming parameters may correspond to different beam directions, different antenna combinations, or combinations thereof. The uplink beamforming parameters may correspond to receive beam beamforming parameters associate with a P3 refinement procedure.

At optional block 530, the UE 115-d may identify the partitioned dimensions. As discussed above, the partitioned dimensions may include one or more of a time dimension, a frequency dimension, a root sequence dimension, a cyclic shift dimension, a time-frequency dimension, or any combination thereof. In some cases, the UE 115-d may identify the partitioned dimensions based on configuration that is received from the base station 105-d. In some cases, the configuration information and the partitioned dimensions may be provided in a SIB, MIB, RMSI, or any combination thereof, and may be transmitted in a PBCH transmission in a SS block, for example. The UE 115-d may identify a particular partitioned uplink dimension based, for example, on beam sweeping measurements and one or more tone beams of a downlink transmission 510 that have a higher gain than other tone beams of the downlink transmission(s) 510.

The UE 115-d may transmit the uplink transmission 535 using determined uplink beamforming parameters for two or more portions of the uplink transmission 535. In some cases, the uplink transmission 535 may be made using the selected partition to convey feedback information to the base station 105-d (e.g., based on gain measurements of one or more tone beams of the downlink transmission(s) 510). In some cases, the uplink transmission 535 may include two or more portions (e.g., two or more tone beams) that are transmitted using different beamforming parameters that correspond to P3 refinement beams.

At block 540, the base station 105-d may receive the uplink transmission 535 and measure the two or more portions of the uplink transmission. In some cases, the base station may optionally determine feedback (e.g., P2 refinement feedback) based on a partition of uplink resource partitioned dimensions used to transmit the uplink transmission 535. In some cases, the base station 105-d may measure a gain of each portion of the uplink transmission 535 that was transmitted using different beamforming parameters.

At block 545, the base station 105-d may identify beam refinement information based on the measurements of the portions of the uplink transmission. In some cases, the beam refinement information may be an identification of a particular portion of the uplink transmission that was measured to have a highest gain (e.g. a highest received power) among the different portions of the uplink transmission 535.

The base station 105-d may then transmit downlink transmission(s) 550 to the UE 115-d. In some cases, the downlink transmission(s) 550 may include an indication of a particular portion of the uplink transmission 535 that was identified for beam refinement information. In some cases, the indication may be indicated based on a partition of one or more partitioned dimensions of the downlink transmission 550 that is used for the downlink transmission.

At block 555, the UE 115-d may receive the downlink transmission(s) 550 and select beamforming parameters as receive beamforming parameters for one or more subsequent downlink transmissions. In some cases, the beamforming parameters may correspond to P3 beam refinement parameters. In some cases, the UE 115-d may identify the particular portion of the uplink transmission 535 that was identified as having a highest gain at the base station 105-d, and may use the beamforming parameters for that portion of the uplink transmission as the beam refinement beamforming parameters for a receive beam of subsequent downlink transmissions. In some cases, the identification of the beamforming parameters may be used on a partition used by the base station 105-d to transmit the downlink transmission(s) 550.

Figure 6:
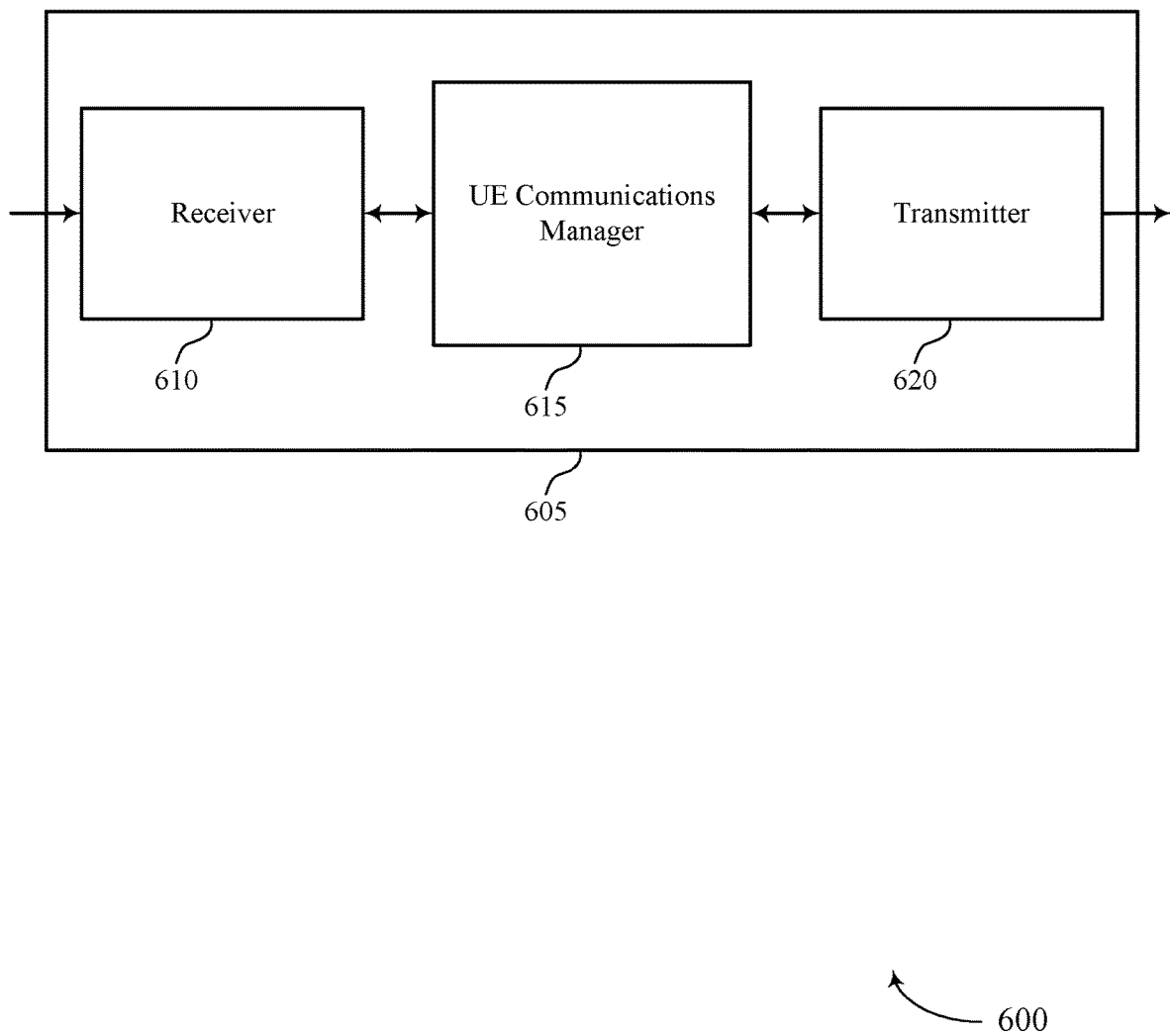
FIGS. 6 through 8 show block diagrams of a device that supports beam refinement techniques in millimeter wave systems in accordance with aspects of the present disclosure.

FIG. 6 shows a block diagram 600 of a wireless device 605 that supports beam refinement techniques in millimeter wave systems in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to beam refinement techniques in millimeter wave systems, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify an uplink resource for an uplink transmission based on a measurement of one or more downlink transmission beams transmitted from a base station in a beam sweep procedure, determine first beamforming parameters for a first portion of the uplink transmission and second beamforming parameters for a second portion of the uplink transmission, such that the first portion of the uplink transmission and the second portion of the uplink transmission are beamformed in different directions, employ different antenna combinations, or a combination thereof, receive an indication from the base station identifying the first portion of the uplink transmission, where the indication is based on measurements of the first portion of the uplink transmission and the second portion of the uplink transmission, and select the first beamforming parameters for receiving a subsequent downlink transmission from the base station based on the indication.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas. Transmitter 620 may transmit the uplink transmission using the uplink resource.

Figure 7:
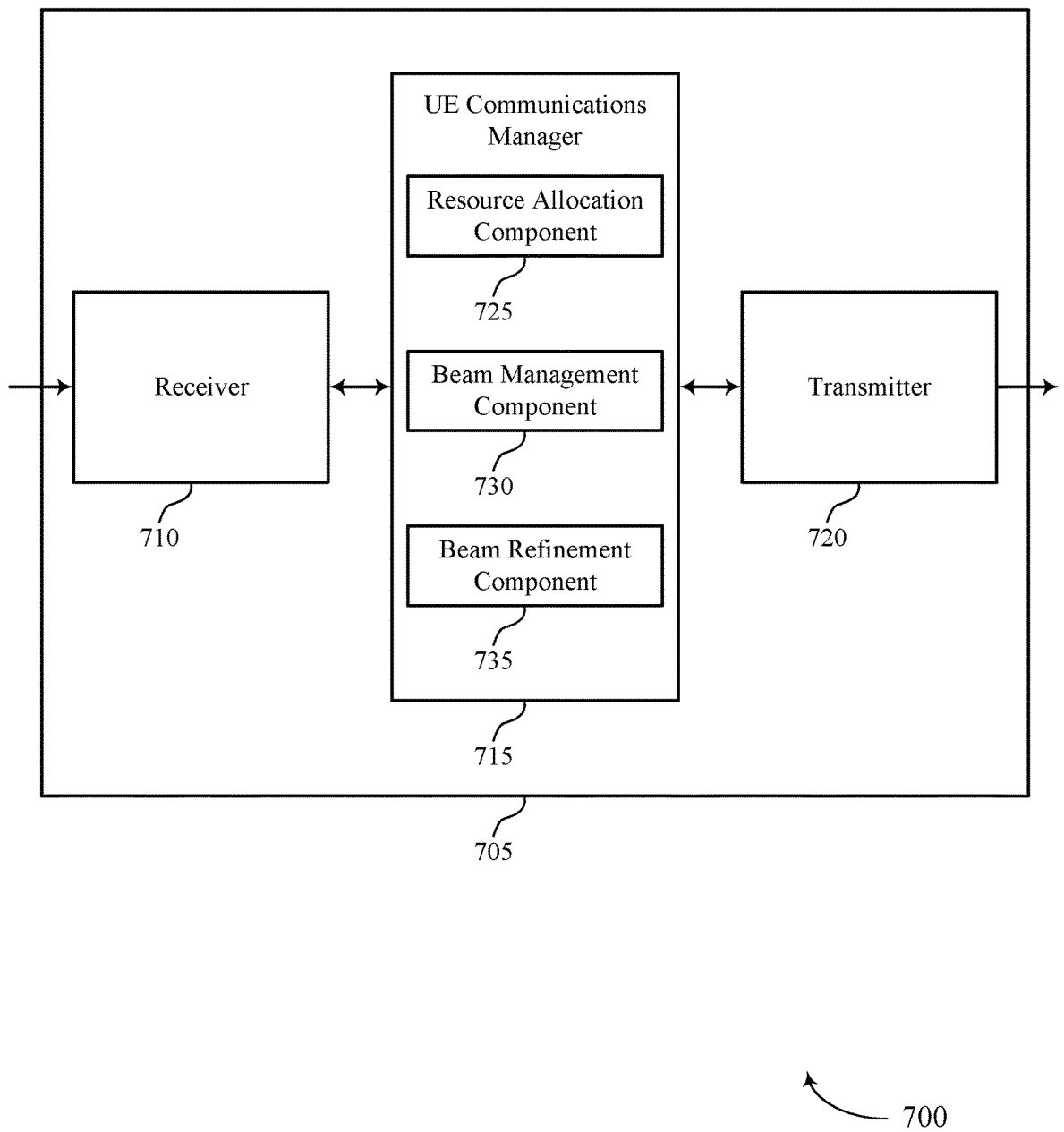

FIG. 7 shows a block diagram 700 of a wireless device 705 that supports beam refinement techniques in millimeter wave systems in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to beam refinement techniques in millimeter wave systems, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include resource allocation component 725, beam management component 730, and beam refinement component 735.

Resource allocation component 725 may identify an uplink resource for an uplink transmission based on a measurement of one or more downlink transmission beams transmitted from a base station in a beam sweep procedure.

Beam management component 730 may determine first beamforming parameters for a first portion of the uplink transmission and second beamforming parameters for a second portion of the uplink transmission, such that the first portion of the uplink transmission and the second portion of the uplink transmission are beamformed in different directions, employ different antenna combinations, or a combination thereof. In some cases, the determining includes identifying the first beamforming parameters as beamforming parameters associated with a first downlink transmission beam received in the beam sweep procedure, based on the measurement of the one or more downlink transmission beams and applying an offset to the first beamforming parameters to determine the second beamforming parameters, such that the first portion of the uplink transmission is beamformed in a first direction and the second portion of the uplink transmission is beamformed in a second direction. In some cases, the determining includes identifying P3 beam refinement parameters for receive beams at the UE.

Beam refinement component 735 may receive an indication from the base station identifying the first portion of the uplink transmission, where the indication is based on measurements of the first portion of the uplink transmission and the second portion of the uplink transmission, and select the first beamforming parameters for receiving a subsequent downlink transmission from the base station based on the indication. In some cases, the indication received from the base station is based on a gain measurement associated with each of the first portion of the uplink transmission and the second portion of the uplink transmission made at the base station. In some cases, the first beamforming parameters for receiving the subsequent downlink are selected based on beam reciprocity between uplink transmission beams and downlink transmission beams.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
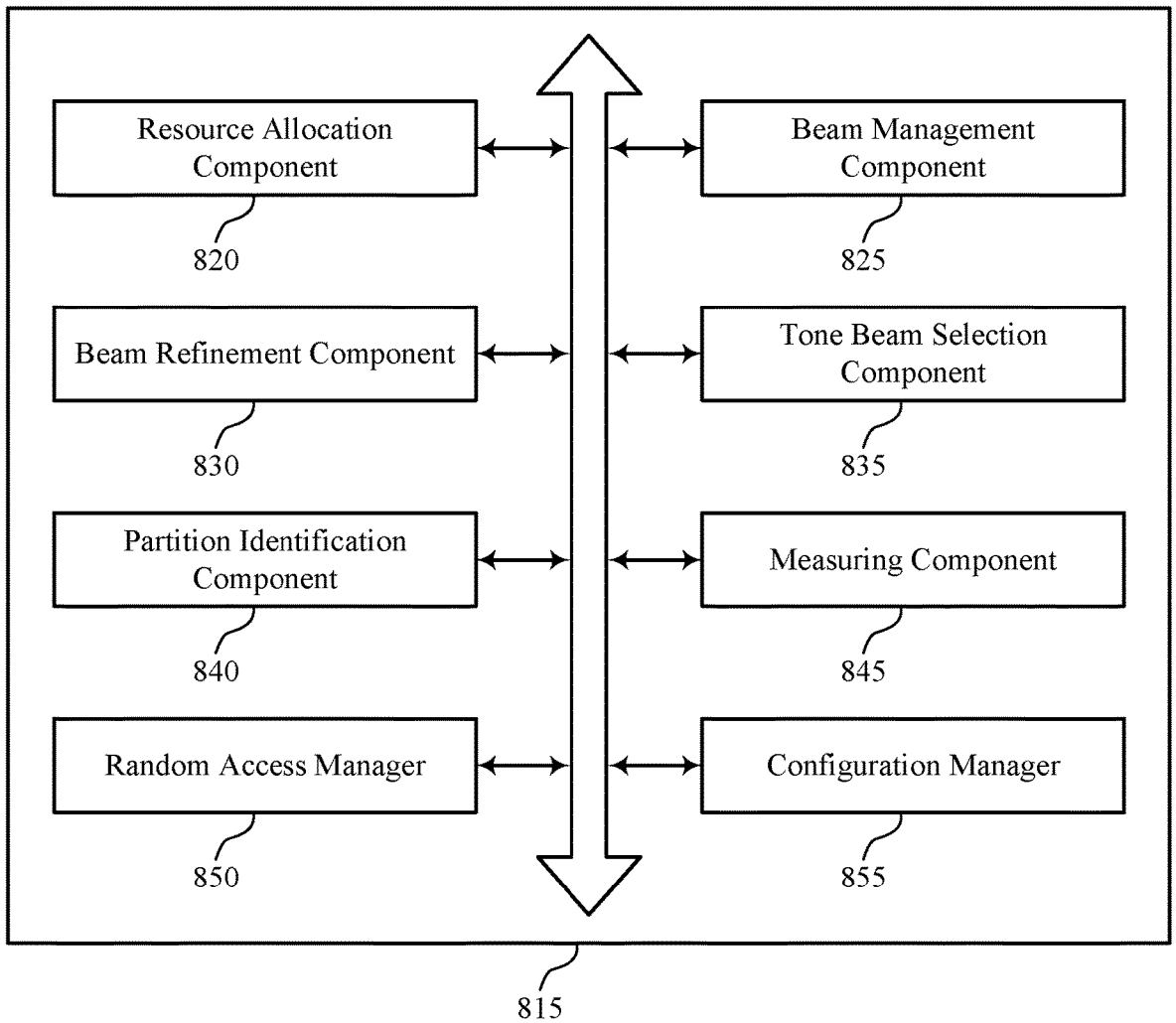

FIG. 8 shows a block diagram 800 of a UE communications manager 815 that supports beam refinement techniques in millimeter wave systems in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include resource allocation component 820, beam management component 825, beam refinement component 830, tone beam selection component 835, partition identification component 840, measuring component 845, random access manager 850, and configuration manager 855. Each of these modules may communicate, directly or indirectly, with one another (e.g., via one or more buses).

Resource allocation component 820 may identify an uplink resource for an uplink transmission based on a measurement of one or more downlink transmission beams transmitted from a base station in a beam sweep procedure.

Beam management component 825 may determine first beamforming parameters for a first portion of the uplink transmission and second beamforming parameters for a second portion of the uplink transmission, such that the first portion of the uplink transmission and the second portion of the uplink transmission are beamformed in different directions, employ different antenna combinations, or a combination thereof. In some cases, the determining includes identifying the first beamforming parameters as beamforming parameters associated with a first downlink transmission beam received in the beam sweep procedure, based on the measurement of the one or more downlink transmission beams and applying an offset to the first beamforming parameters to determine the second beamforming parameters, such that the first portion of the uplink transmission is beamformed in a first direction and the second portion of the uplink transmission is beamformed in a second direction. In some cases, the determining includes identifying P3 beam refinement parameters for receive beams at the UE.

Beam refinement component 830 may receive an indication from the base station identifying the first portion of the uplink transmission, where the indication is based on measurements of the first portion of the uplink transmission and the second portion of the uplink transmission, and select the first beamforming parameters for receiving a subsequent downlink transmission from the base station based on the indication. In some cases, the indication received from the base station is based on a gain measurement associated with each of the first portion of the uplink transmission and the second portion of the uplink transmission made at the base station. In some cases, the first beamforming parameters for receiving the subsequent downlink are selected based on beam reciprocity between uplink transmission beams and downlink transmission beams.

Tone beam selection component 835 may select two or more tone beams for transmission using different beamforming parameters. In some cases, the first portion of the uplink transmission includes a first subset of frequency tones of the uplink resource and the second portion of the uplink transmission includes a second subset of the frequency tones of the uplink resource.

Partition identification component 840 may identify one or more partitioned dimensions and associated partitions for indicating particular feedback information. In some cases, the receiving the indication includes receiving a downlink transmission from the base station and determining the indication based on one or more partitioned dimensions used to transmit the downlink transmission. In some cases, the one or more partitioned dimensions include one or more of a time resource dimension, a frequency resource dimension, a root sequence dimension, a cyclic shift dimension, a time-frequency resource dimension, or any combination thereof.

Measuring component 845 may measure one or more signal characteristics. In some cases, the identifying the uplink resource includes measuring a channel quality characteristic of the one or more downlink transmission beams from the base station in the beam sweep procedure, and the selecting the uplink resource for the uplink transmission is based on the measuring. In some cases, the measuring the one or more downlink transmission beams includes identifying two or more tone beams in a first downlink transmission beam, the two or more tone beams being beamformed in different directions, and measuring a gain of each of the two or more tone beams.

Random access manager 850 may manage a random access procedure at the UE. In some cases, the uplink transmission is a random access transmission, and the indication is received in a random access response from the base station.

Configuration manager 855 may receive configuration information that identifies the first portion of the uplink transmission and the second portion of the uplink transmission. The configuration may be received, for example, in RRC signaling, in a MIB/SIB/RMSI, or combinations thereof.

Figure 9:
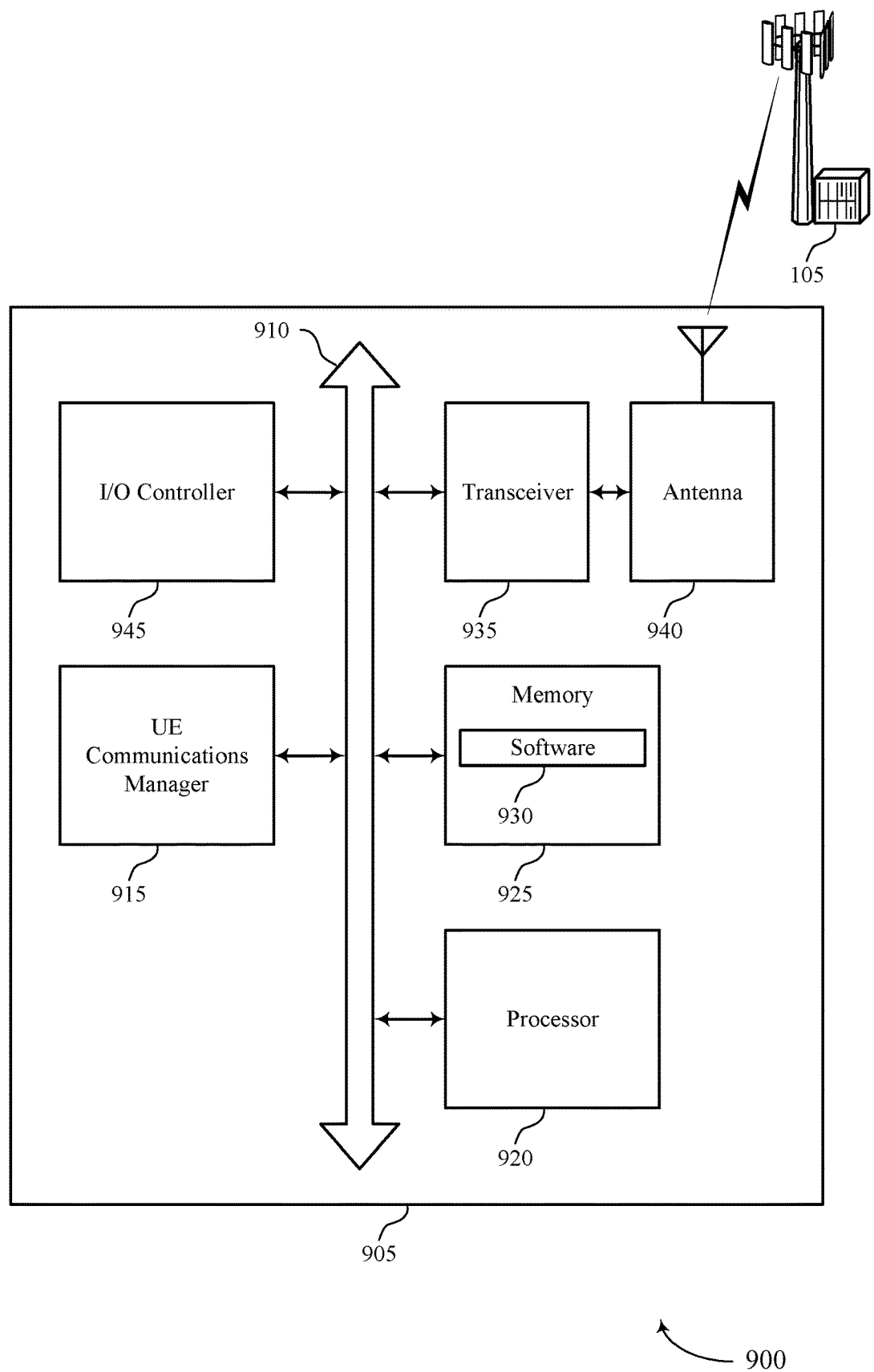
FIG. 9 illustrates a block diagram of a system including a UE that supports beam refinement techniques in millimeter wave systems in accordance with aspects of the present disclosure.

FIG. 9 shows a diagram of a system 900 including a device 905 that supports beam refinement techniques in millimeter wave systems in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting beam refinement techniques in millimeter wave systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support beam refinement techniques in millimeter wave systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
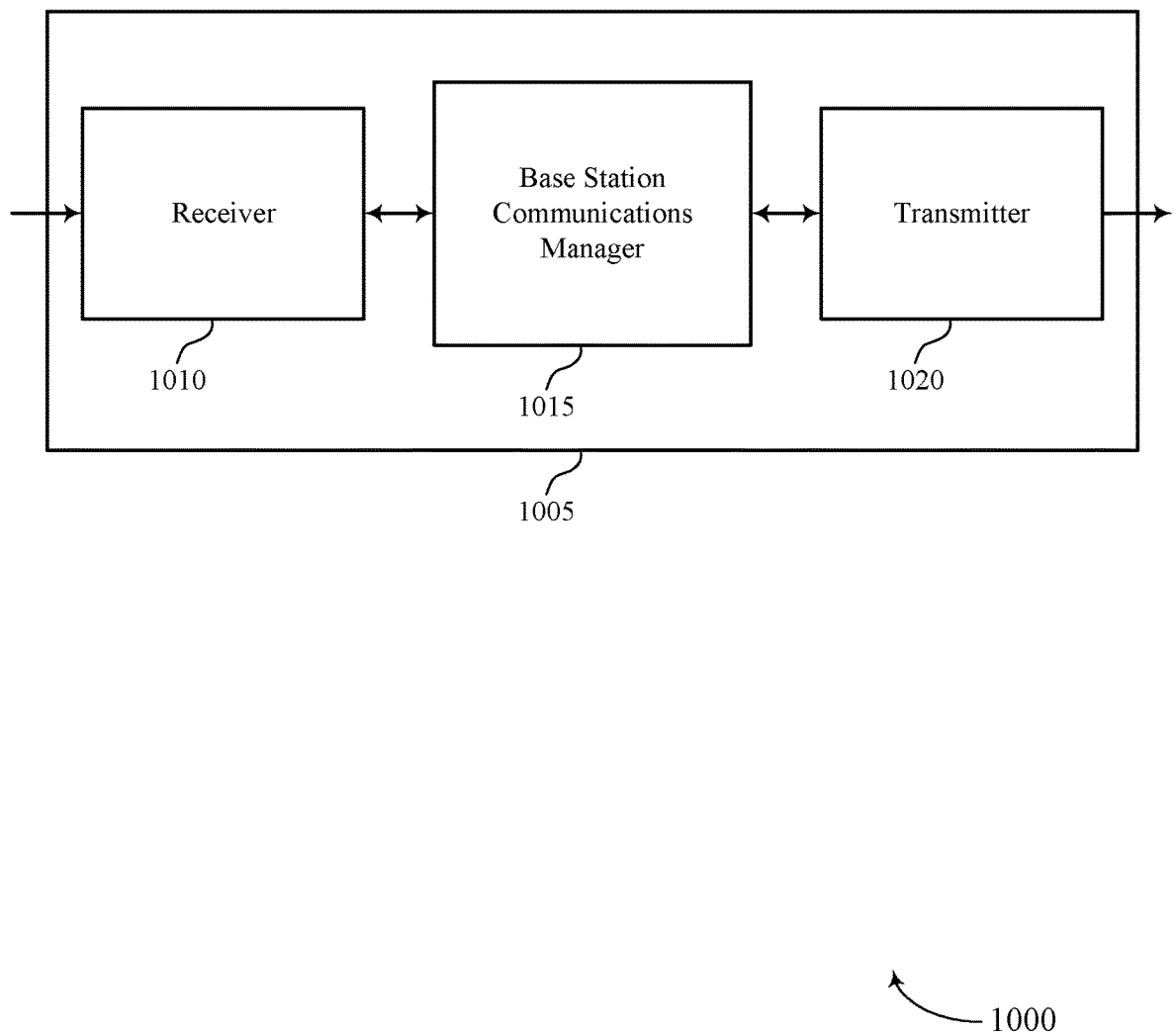
FIGS. 10 through 12 show block diagrams of a device that supports beam refinement techniques in millimeter wave systems in accordance with aspects of the present disclosure.

FIG. 10 shows a block diagram 1000 of a wireless device 1005 that supports beam refinement techniques in millimeter wave systems in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to beam refinement techniques in millimeter wave systems, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit one or more downlink transmission beams to a UE in a beam sweep procedure, receive an uplink transmission from the UE responsive to one of the one or more downlink transmission beams, the uplink transmission including two or more beamformed signals that are beamformed in different directions, employ different antenna combinations, or a combination thereof, measure one or more characteristics of each of the two or more beamformed signals of the uplink transmission, and identify a first beamformed signal of the two or more beamformed signals of the uplink transmission based on the measuring.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas. Transmitter 1020 may transmit an indication of the first beamformed signal to the UE.

Figure 11:
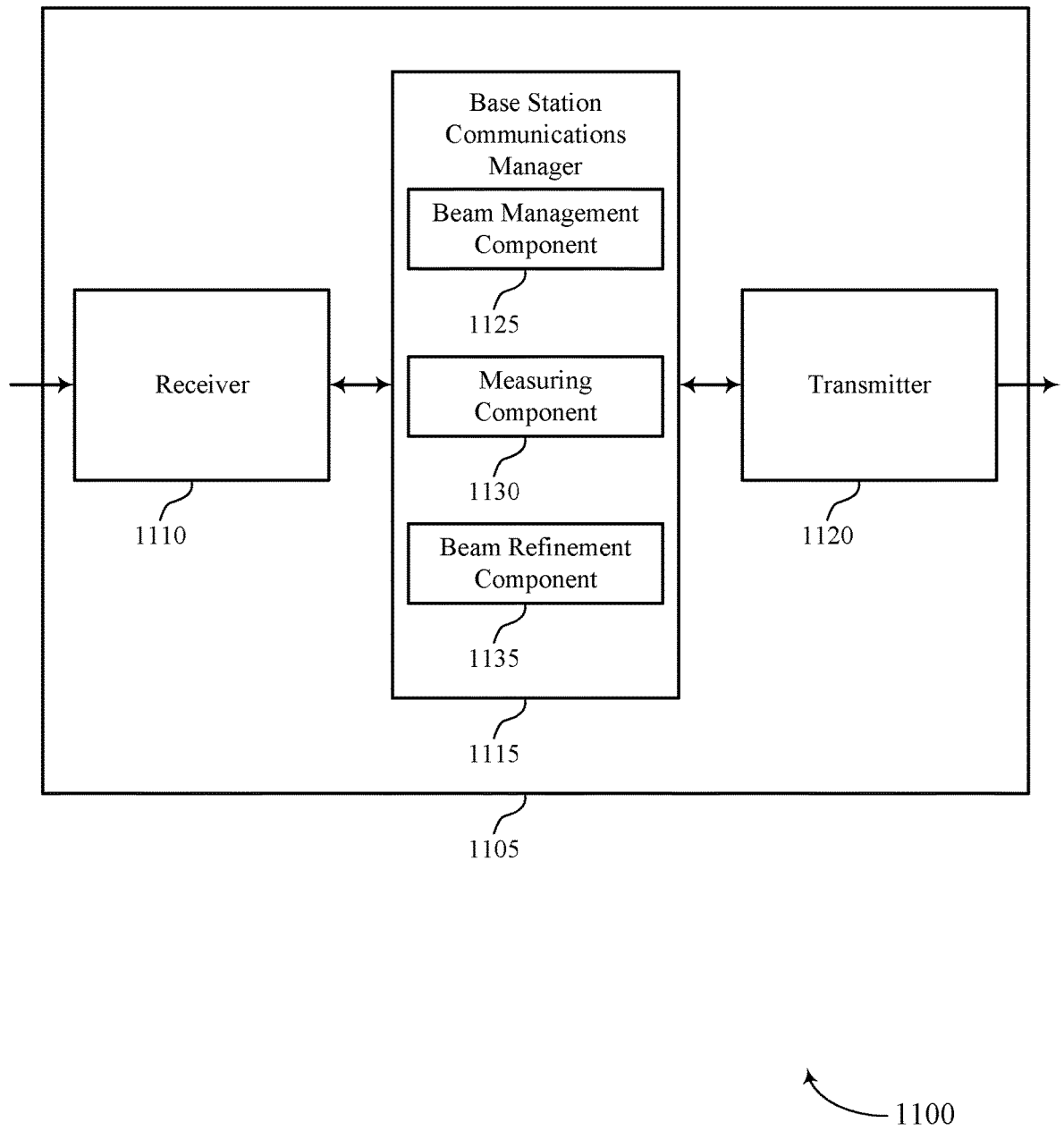

FIG. 11 shows a block diagram 1100 of a wireless device 1105 that supports beam refinement techniques in millimeter wave systems in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to beam refinement techniques in millimeter wave systems, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include beam management component 1125, measuring component 1130, and beam refinement component 1135.

Beam management component 1125 may transmit one or more downlink transmission beams to a UE in a beam sweep procedure and receive an uplink transmission from the UE responsive to one of the one or more downlink transmission beams, the uplink transmission including two or more beamformed signals that are beamformed in different directions, employ different antenna combinations, or a combination thereof.

Measuring component 1130 may measure one or more characteristics of each of the two or more beamformed signals of the uplink transmission. In some cases, the measuring includes measuring a gain associated with each of the two or more beamformed signals.

Beam refinement component 1135 may identify a first beamformed signal of the two or more beamformed signals of the uplink transmission based on the measuring.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
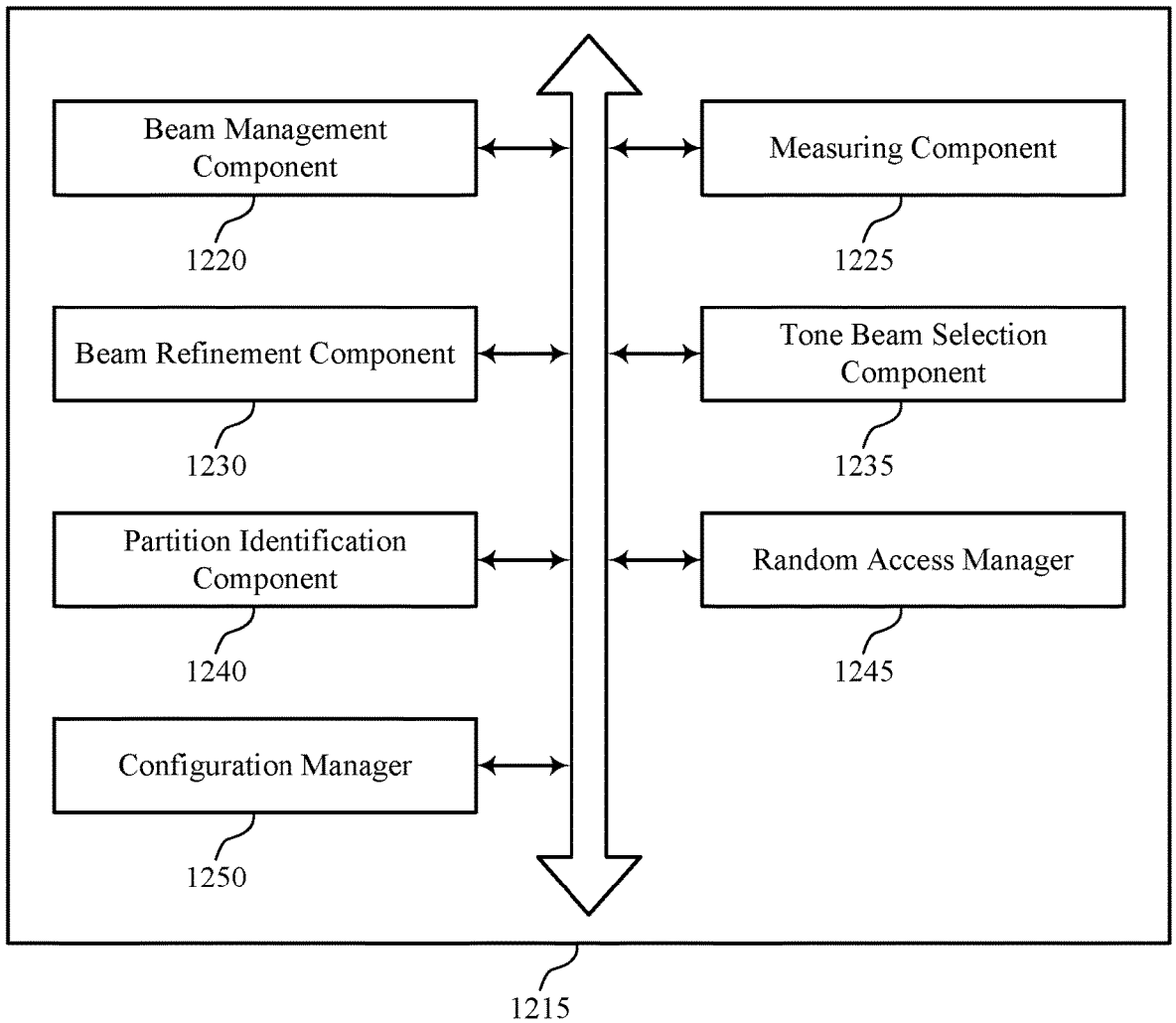

FIG. 12 shows a block diagram 1200 of a base station communications manager 1215 that supports beam refinement techniques in millimeter wave systems in accordance with aspects of the present disclosure. The base station communications manager 1215 may be an example of aspects of a base station communications manager 1315 described with reference to FIGS. 10, 11, and 13. The base station communications manager 1215 may include beam management component 1220, measuring component 1225, beam refinement component 1230, tone beam selection component 1235, partition identification component 1240, random access manager 1245, and configuration manager 1250. Each of these modules may communicate, directly or indirectly, with one another (e.g., via one or more buses).

Beam management component 1220 may transmit one or more downlink transmission beams to a UE in a beam sweep procedure and receive an uplink transmission from the UE responsive to one of the one or more downlink transmission beams, the uplink transmission including two or more beamformed signals that are beamformed in different directions, employ different antenna combinations, or a combination thereof.

Measuring component 1225 may measure one or more characteristics of each of the two or more beamformed signals of the uplink transmission. In some cases, the measuring includes measuring a gain associated with each of the two or more beamformed signals.

Beam refinement component 1230 may identify a first beamformed signal of the two or more beamformed signals of the uplink transmission based on the measuring.

Tone beam selection component 1235 may identify tone beams associated with each beamformed signal. In some cases, the two or more beamformed signals include two or more tone beams transmitted in the uplink transmission. In some cases, the tone beams may be identified based on a tone beam index configured for the uplink transmission.

Partition identification component 1240 may identify and configure different partitions for one or more partitioned dimensions that may be used to indicate feedback information. In some cases, the receiving the uplink transmission includes identifying an uplink partition of a set of configured uplink partitioned dimensions used to transmit the uplink transmission, each configured uplink partitioned dimension including two or more partitions that are associated with different beam refinement feedback, and determining the beam refinement feedback based on the identified uplink partition. In some cases, the transmitting the indication includes identifying one or more partitioned dimensions of a response downlink transmission, each partitioned dimension including two or more partitions that are associated with different indications, selecting a first partition of the one or more partitioned dimensions that is associated with the first beamformed signal, and transmitting the response downlink transmission using the selected first partition. In some cases, the one or more partitioned dimensions include one or more of a time resource dimension, a frequency resource dimension, a root sequence dimension, a cyclic shift dimension, a time-frequency resource dimension, or any combination thereof.

Random access manager 1245 may manage random access procedure at the base station. In some cases, the uplink transmission is a random access transmission, and the indication is transmitted in a random access response to the UE.

Configuration manager 1250 may transmit configuration information to the UE that identifies at least a first portion of the uplink transmission and a second portion of the uplink transmission that are to be used for transmission of the two or more beamformed signals of the uplink transmission. The configuration may be transmitted, for example, in RRC signaling, in a MIB/SIB/RMSI, or combinations thereof.

Figure 13:
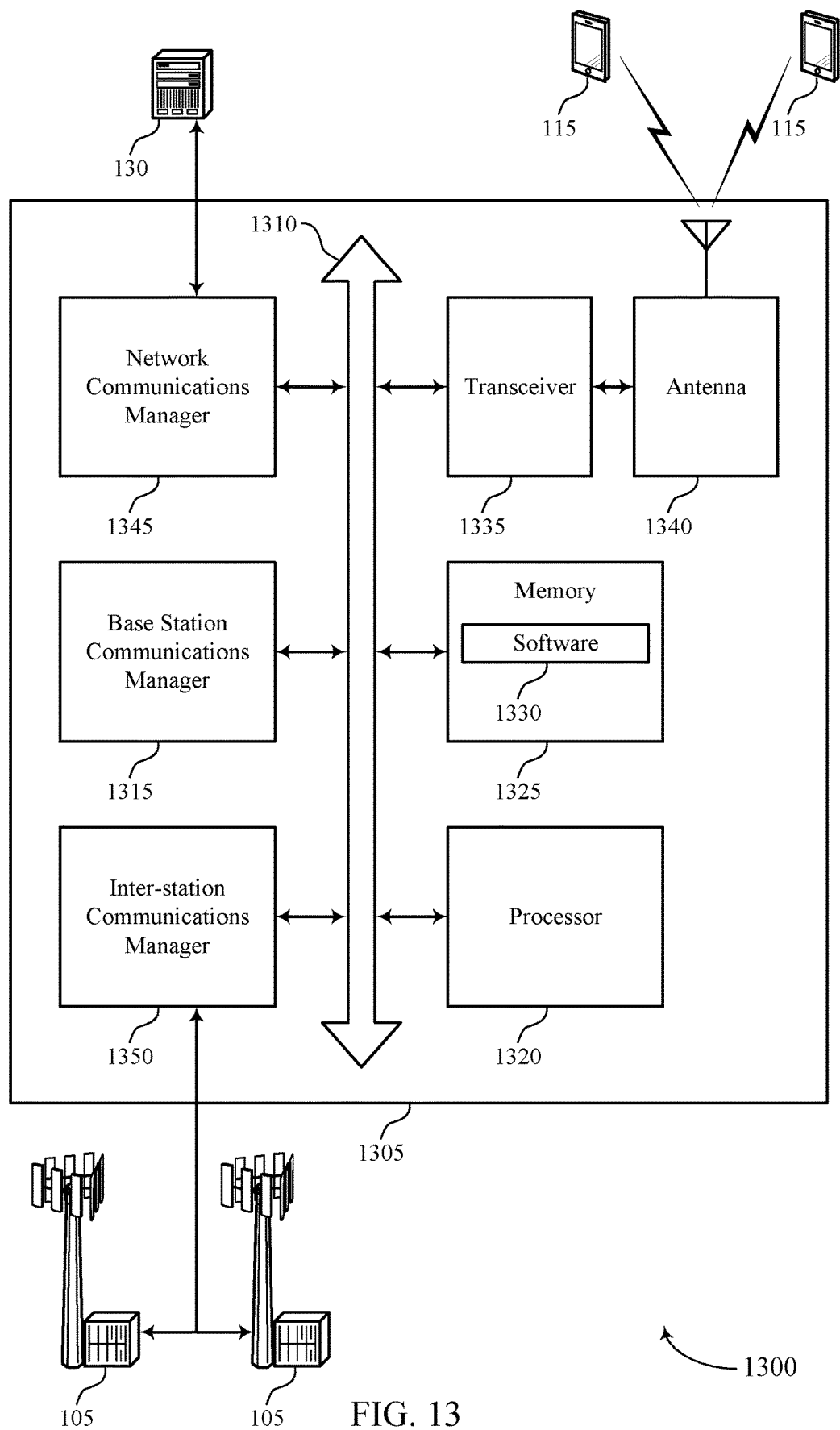
FIG. 13 illustrates a block diagram of a system including a base station that supports beam refinement techniques in millimeter wave systems in accordance with aspects of the present disclosure.

FIG. 13 shows a diagram of a system 1300 including a device 1305 that supports beam refinement techniques in millimeter wave systems in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting beam refinement techniques in millimeter wave systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support beam refinement techniques in millimeter wave systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
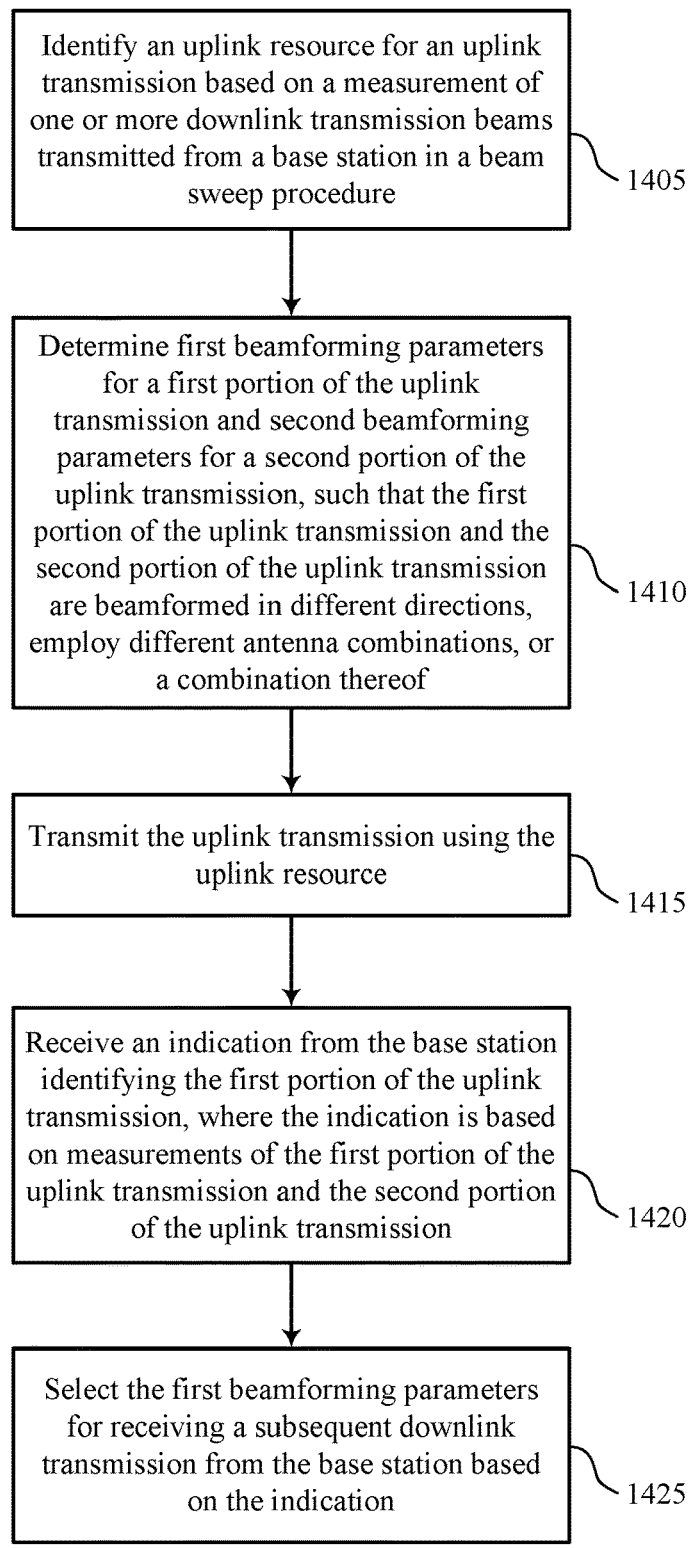
FIGS. 14 through 15 illustrate methods for beam refinement techniques in millimeter wave systems in accordance with aspects of the present disclosure.

FIG. 14 shows a flowchart illustrating a method 1400 for beam refinement techniques in millimeter wave systems in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify an uplink resource for an uplink transmission based at least in part on a measurement of one or more downlink transmission beams transmitted from a base station in a beam sweep procedure. The operations of block 1405 may be performed according to the methods described herein. In certain examples, aspects of the operations of block 1405 may be performed by a resource allocation component as described with reference to FIGS. 6 through 9. In some cases, the UE may identify the uplink resource based on a beam of the beam sweep procedure that is measured by the UE as having a highest gain, or an acceptable gain. In some cases, the gain measurement may be based on a reference signal received power (RSRP). As indicated above, a base station, during the beam sweep procedure may transmit a series relatively wide, low-gain beams in an SS block and each SS block may have an associated RACH resource such that a random access transmission using a RACH resource may identify the beam of the SS block that the UE measured as an acceptable receive beam. In some cases, the uplink resource identified by the UE is such a RACH resource that is associated with an SS block based on the UE measurement of beams in the beam sweep procedure.

At block 1410 the UE 115 may determine first beamforming parameters for a first portion of the uplink transmission and second beamforming parameters for a second portion of the uplink transmission, such that the first portion of the uplink transmission and the second portion of the uplink transmission are beamformed in different directions, employ different antenna combinations, or a combination thereof. The operations of block 1410 may be performed according to the methods described herein. In certain examples, aspects of the operations of block 1410 may be performed by a beam management component as described with reference to FIGS. 6 through 9. In some cases, the beamforming parameters may be determined for different tone beams of the uplink transmission. In some cases, the first portion of the uplink transmission and the second portion of the uplink transmission correspond to tone beams transmitted by the UE as part of the receive beam refinement procedure. In some cases, the first uplink portion and the second uplink portion (e.g., two or more tone beams) may be transmitted using different beamforming parameters transmitted using a known set of frequency resources (e.g., configured by RRC signaling, signaled in MIB, SIB, RMSI, or combinations thereof). Under the assumption of beam reciprocity, these transmitted beam refinement signals can be set to correspond to a set of P3 refinement reference signals transmitted to the UE.

At block 1415 the UE 115 may transmit the uplink transmission using the uplink resource. The operations of block 1415 may be performed according to the methods described herein. In certain examples, aspects of the operations of block 1415 may be performed by a transmitter as described with reference to FIGS. 6 through 9. In some cases, as indicated above, the uplink resource may be an RACH resource associated with the SS block of a beam from the beam sweep procedure that is measured at the UE as having a highest gain, or an acceptable gain.

At block 1420 the UE 115 may receive an indication from the base station identifying the first portion of the uplink transmission, wherein the indication is based at least in part on measurements of the first portion of the uplink transmission and the second portion of the uplink transmission. The operations of block 1420 may be performed according to the methods described herein. In certain examples, aspects of the operations of block 1420 may be performed by a beam refinement component as described with reference to FIGS. 6 through 9. In some cases, the indication from the base station may identify beam refinement information based on the measurements of the portions of the uplink transmission. In some cases, the beam refinement information may be an identification of a particular portion of the uplink transmission that was measured to have a highest gain (e.g. a highest received power) among the first portion of the uplink transmission and the second portion of the uplink transmission. In some cases, the indication may be explicitly signaled. In other cases, the indication may be identified based on a partition of one or more partitioned dimensions of a downlink transmission used for transmission of the indication, as discussed above.

At block 1425 the UE 115 may select the first beamforming parameters for receiving a subsequent downlink transmission from the base station based at least in part on the indication. The operations of block 1425 may be performed according to the methods described herein. In certain examples, aspects of the operations of block 1425 may be performed by a beam refinement component as described with reference to FIGS. 6 through 9. In some cases, the UE may receive the indication of the first portion of the uplink transmission, and select the beamforming parameters associated with the first portion of the uplink transmission as receive beamforming parameters for one or more subsequent downlink transmissions, based on beam reciprocity. In some cases, the beamforming parameters may correspond to P3 beam refinement parameters.

Figure 15:
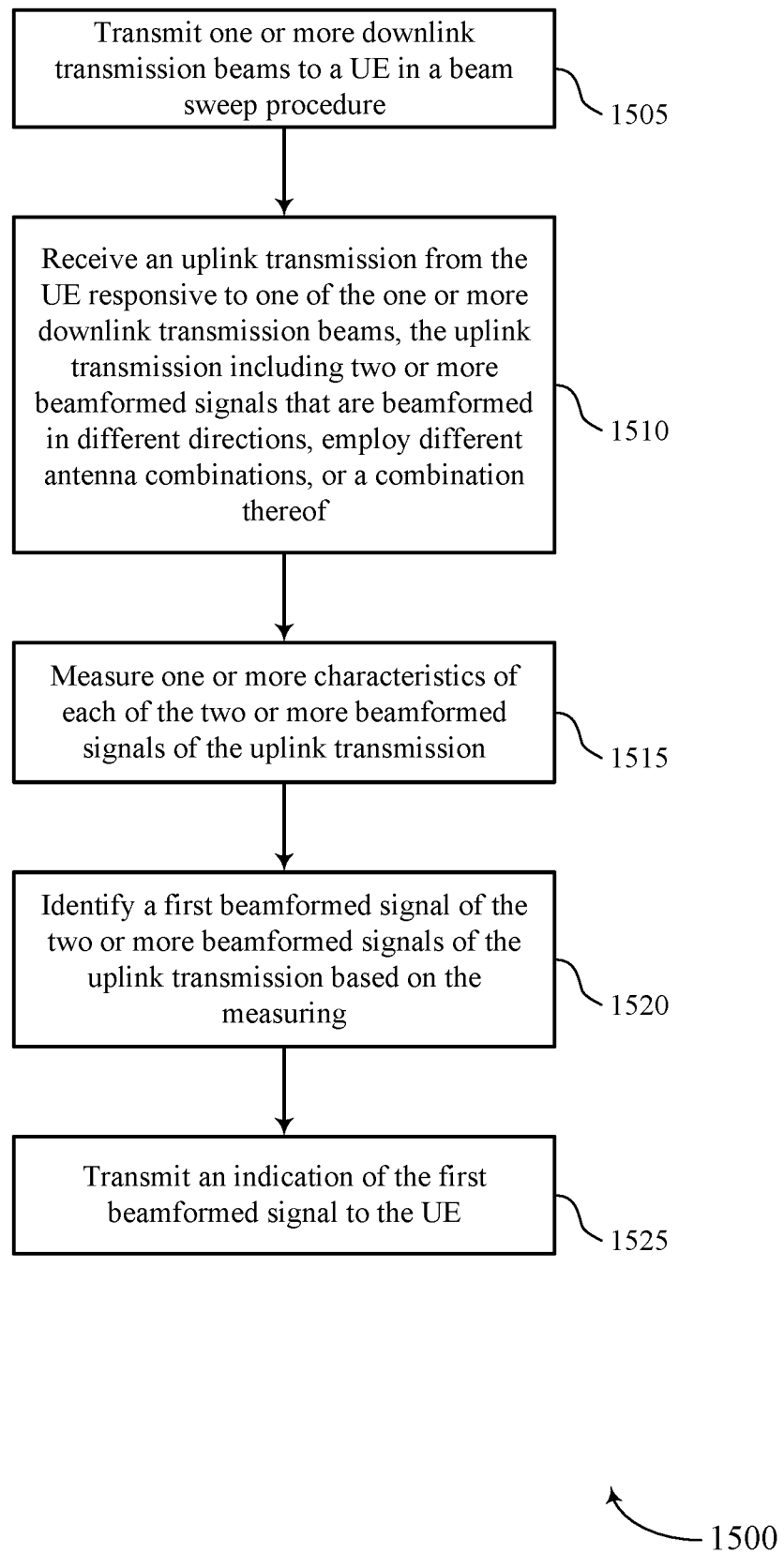

FIG. 15 shows a flowchart illustrating a method 1500 for beam refinement techniques in millimeter wave systems in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit one or more downlink transmission beams to a user equipment (UE) in a beam sweep procedure. The operations of block 1505 may be performed according to the methods described herein. In certain examples, aspects of the operations of block 1505 may be performed by a beam management component as described with reference to FIGS. 10 through 13. In some cases, as discussed above, the base station, during the beam sweep procedure may transmit a series relatively wide, low-gain beams in an SS block and each SS block may have an associated RACH resource such that a random access transmission using a RACH resource may identify the beam of the SS block that a UE may measure as an acceptable receive beam.

At block 1510 the base station 105 may receive an uplink transmission from the UE responsive to one of the one or more downlink transmission beams, the uplink transmission including two or more beamformed signals that are beamformed in different directions, employ different antenna combinations, or a combination thereof. The operations of block 1510 may be performed according to the methods described herein. In certain examples, aspects of the operations of block 1510 may be performed by a beam management component as described with reference to FIGS. 10 through 13. In some cases, the uplink transmission may be transmitted in an uplink resource that is associated with one or the downlink transmission beams. In some cases, the uplink resource may be the RACH resource associated with an SS block of the downlink transmission beam, and may indicate that the UE measured the associated downlink transmission beam of the beam sweep procedure as having a highest gain, or an acceptable gain. In some cases, the two or more beamformed signals in the uplink transmission may correspond to tone beams transmitted by the UE as part of the receive beam refinement procedure. In some cases, the two or more beamformed signals (e.g., two or more tone beams) may be transmitted using different beamforming parameters using a known set of frequency resources (e.g., configured by RRC signaling, signaled in MIB, SIB, RMSI, or combinations thereof).

At block 1515 the base station 105 may measure one or more characteristics of each of the two or more beamformed signals of the uplink transmission. The operations of block 1515 may be performed according to the methods described herein. In certain examples, aspects of the operations of block 1515 may be performed by a measuring component as described with reference to FIGS. 10 through 13. In some cases, as discussed above, the two or more beamformed signals in the uplink transmission may correspond to tone beams transmitted by the UE as part of the receive beam refinement procedure. The base station may measure one or more characteristics, such as a received power or gain, for example, of each of the two or more beamformed signals.

At block 1520 the base station 105 may identify a first beamformed signal of the two or more beamformed signals of the uplink transmission based at least in part on the measuring. The operations of block 1520 may be performed according to the methods described herein. In certain examples, aspects of the operations of block 1520 may be performed by a beam refinement component as described with reference to FIGS. 10 through 13. In some cases, the base station may identify the first beamformed signal based on which of the two or more beamformed signals of the uplink transmission was measured to have a highest received power or gain, or an acceptable received power or gain. The base station may, in some cases, store each of the measured characteristics (e.g., received power or gain), compare the characteristics, and identify the first beamformed signal based at least in part on the comparison.

At block 1525 the base station 105 may transmit an indication of the first beamformed signal to the UE. The operations of block 1525 may be performed according to the methods described herein. In certain examples, aspects of the operations of block 1525 may be performed by a transmitter as described with reference to FIGS. 10 through 13. In some cases, the indication may identify beam refinement information based on the measurements of the characteristics of the two or more beamformed signals of the uplink transmission and the identified first beamformed signal. In some cases, the beam refinement information may be an identification of the first beamformed signal (e.g., based on an index associated with a particular tone beam of the first beamformed signal). In some cases, the indication may be explicitly signaled. In other cases, the indication may be identified based on a partition of one or more partitioned dimensions of a downlink transmission to the UE, as discussed above.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting one or more downlink transmission beams to a user equipment (UE) in a beam sweep procedure;
   receiving an uplink transmission from the UE, in an uplink resource associated with one of the downlink transmission beams, the uplink transmission including two or more beamformed signals that are beamformed in different directions, employ different antenna combinations, or a combination thereof;
measuring one or more characteristics of each of the two or more beamformed signals of the uplink transmission;
identifying a first beamformed signal of the two or more beamformed signals of the uplink transmission based at least in part on the measuring and the uplink resource used for the uplink transmission from the UE; and
transmitting an indication of the first beamformed signal to the UE based at least in part on the measuring.

2. The method of claim 1, wherein:
the two or more beamformed signals comprise two or more tone beams transmitted in the uplink transmission.

3. The method of claim 2, further comprising:
measuring a gain associated with each of the two or more tone beams transmitted in the uplink transmission.

4. The method of claim 1, wherein the transmitting the indication comprises:
transmitting a response downlink transmission using a first partition of one or more partitioned dimensions for the response downlink transmission that is associated with the first beamformed signal, wherein each partition of the one or more partitioned dimensions is associated with a different indication.

5. The method of claim 4, wherein:
the one or more partitioned dimensions comprise one or more of a time resource dimension, a frequency resource dimension, a root sequence dimension, a cyclic shift dimension, a time-frequency resource dimension, or any combination thereof.

6. The method of claim 1, wherein the indication is further based at least in part on an uplink partition of a plurality of configured uplink partitioned dimensions used to transmit the uplink transmission, each configured uplink partitioned dimension comprising two or more partitions that are associated with different beam refinement feedback.

7. The method of claim 1, wherein:
the uplink transmission is a random access transmission, and the indication is transmitted in a random access response to the UE.

8. The method of claim 1, further comprising:
transmitting configuration information to the UE that identifies at least a first portion of the uplink transmission and a second portion of the uplink transmission that are to be used for transmission of the two or more beamformed signals of the uplink transmission.

9. The method of claim 1, wherein the uplink resource is one of a plurality of uplink resources that are each associated with a different downlink transmission beam of a plurality of downlink transmission beams used in the beam sweep procedure.

10. The method of claim 9, wherein the uplink resource is selected based at least in part on a UE measurement of the one or more downlink transmission beams.

11. An apparatus for wireless communication, comprising:
a processor,
memory coupled with the processor; and
instructions stored in the memory and executable by the processor to cause the apparatus to:
transmit one or more downlink transmission beams to a user equipment (UE) in a beam sweep procedure;
receive an uplink transmission from the UE, in an uplink resource associated with one of the downlink transmission beams, the uplink transmission including two or more beamformed signals that are beamformed in different directions, employ different antenna combinations, or a combination thereof;
measure one or more characteristics of each of the two or more beamformed signals of the uplink transmission;
identify a first beamformed signal of the two or more beamformed signals of the uplink transmission based at least in part on the measuring and the uplink resource used for the uplink transmission from the UE; and
transmit an indication of the first beamformed signal to the UE based at least in part on the measuring.

12. The apparatus of claim 11, wherein the two or more beamformed signals comprise two or more tone beams transmitted in the uplink transmission.

13. The apparatus of claim 12, wherein the instructions are further executable by the processor to cause the apparatus to:
measure a gain associated with each of the two or more tone beams transmitted in the uplink transmission.

14. The apparatus of claim 11, wherein the instructions are further executable by the processor to cause the apparatus to:
transmit a response downlink transmission using a first partition of one or more partitioned dimensions for the response downlink transmission that is associated with the first beamformed signal, wherein each partition of the one or more partitioned dimensions is associated with a different indication.

15. The apparatus of claim 14, wherein the one or more partitioned dimensions comprise one or more of a time resource dimension, a frequency resource dimension, a root sequence dimension, a cyclic shift dimension, a time-frequency resource dimension, or any combination thereof.

16. The apparatus of claim 11, wherein the indication is further based at least in part on an uplink partition of a plurality of configured uplink partitioned dimensions used to transmit the uplink transmission, each configured uplink partitioned dimension comprising two or more partitions that are associated with different beam refinement feedback.

17. The apparatus of claim 11, wherein the uplink transmission is a random access transmission, and the indication is transmitted in a random access response to the UE.

18. The apparatus of claim 11, wherein the instructions are further executable by the processor to cause the apparatus to:
transmit configuration information to the UE that identifies at least a first portion of the uplink transmission and a second portion of the uplink transmission that are to be used for transmission of the two or more beamformed signals of the uplink transmission.

19. The apparatus of claim 11, wherein the uplink resource is one of a plurality of uplink resources that are each associated with a different downlink transmission beam of a plurality of downlink transmission beams used in the beam sweep procedure.

20. The apparatus of claim 19, wherein the uplink resource is selected based at least in part on a UE measurement of the one or more downlink transmission beams.

21. An apparatus for wireless communication, comprising:
means for transmitting one or more downlink transmission beams to a user equipment (UE) in a beam sweep procedure;
means for receiving an uplink transmission from the UE, in an uplink resource associated with one of the downlink transmission beams, the uplink transmission including two or more beamformed signals that are beamformed in different directions, employ different antenna combinations, or a combination thereof;

means for measuring one or more characteristics of each of the two or more beamformed signals of the uplink transmission;

means for identifying a first beamformed signal of the two or more beamformed signals of the uplink transmission based at least in part on the measuring and the uplink resource used for the uplink transmission from the UE; and means for transmitting an indication of the first beamformed signal to the UE based at least in part on the measuring.

22. The apparatus of claim 21, wherein the two or more beamformed signals comprise two or more tone beams transmitted in the uplink transmission.

23. The apparatus of claim 22, further comprising:

means for measuring a gain associated with each of the two or more tone beams transmitted in the uplink transmission.

24. The apparatus of claim 21, wherein the means for transmitting the indication transmits a response downlink transmission using a first partition of one or more partitioned dimensions for the response downlink transmission that is associated with the first beamformed signal, wherein each partition of the one or more partitioned dimensions is associated with a different indication.

25. The apparatus of claim 24, wherein the one or more partitioned dimensions comprise one or more of a time resource dimension, a frequency resource dimension, a root sequence dimension, a cyclic shift dimension, a time-frequency resource dimension, or any combination thereof.

26. A non-transitory computer-readable medium storing code for wireless communication, the code comprising instructions executable by a processor to:

transmit one or more downlink transmission beams to a user equipment (UE) in a beam sweep procedure;

receive an uplink transmission from the UE, in an uplink resource associated with one of the downlink transmission beams, the uplink transmission including two or more beamformed signals that are beamformed in different directions, employ different antenna combinations, or a combination thereof;

measure one or more characteristics of each of the two or more beamformed signals of the uplink transmission;

identify a first beamformed signal of the two or more beamformed signals of the uplink transmission based at least in part on the measuring and the uplink resource used for the uplink transmission from the UE; and transmit an indication of the first beamformed signal to the UE based at least in part on the measuring.

27. The non-transitory computer-readable medium of claim 26, wherein the two or more beamformed signals comprise two or more tone beams transmitted in the uplink transmission.

28. The non-transitory computer-readable medium of claim 26, wherein the instructions are further executable to:

transmit a response downlink transmission using a first partition of one or more partitioned dimensions for the response downlink transmission that is associated with the first beamformed signal, wherein each partition of the one or more partitioned dimensions is associated with a different indication.

29. The non-transitory computer-readable medium of claim 28, wherein the one or more partitioned dimensions comprise one or more of a time resource dimension, a frequency resource dimension, a root sequence dimension, a cyclic shift dimension, a time-frequency resource dimension, or any combination thereof.

30. The non-transitory computer-readable medium of claim 26, wherein the indication is further based at least in part on an uplink partition of a plurality of configured uplink partitioned dimensions used to transmit the uplink transmission, each configured uplink partitioned dimension comprising two or more partitions that are associated with different beam refinement feedback.

* * * * *